SEARCH ROO
Jan. 7, 1941. W. A. BROWN Re. 21,689
TORQUE-BRAKE SHOCK ABSORBING WHEEL Orig. 2,176,056
Original Filed May 3, 1938 4 Sheets-Sheet 1
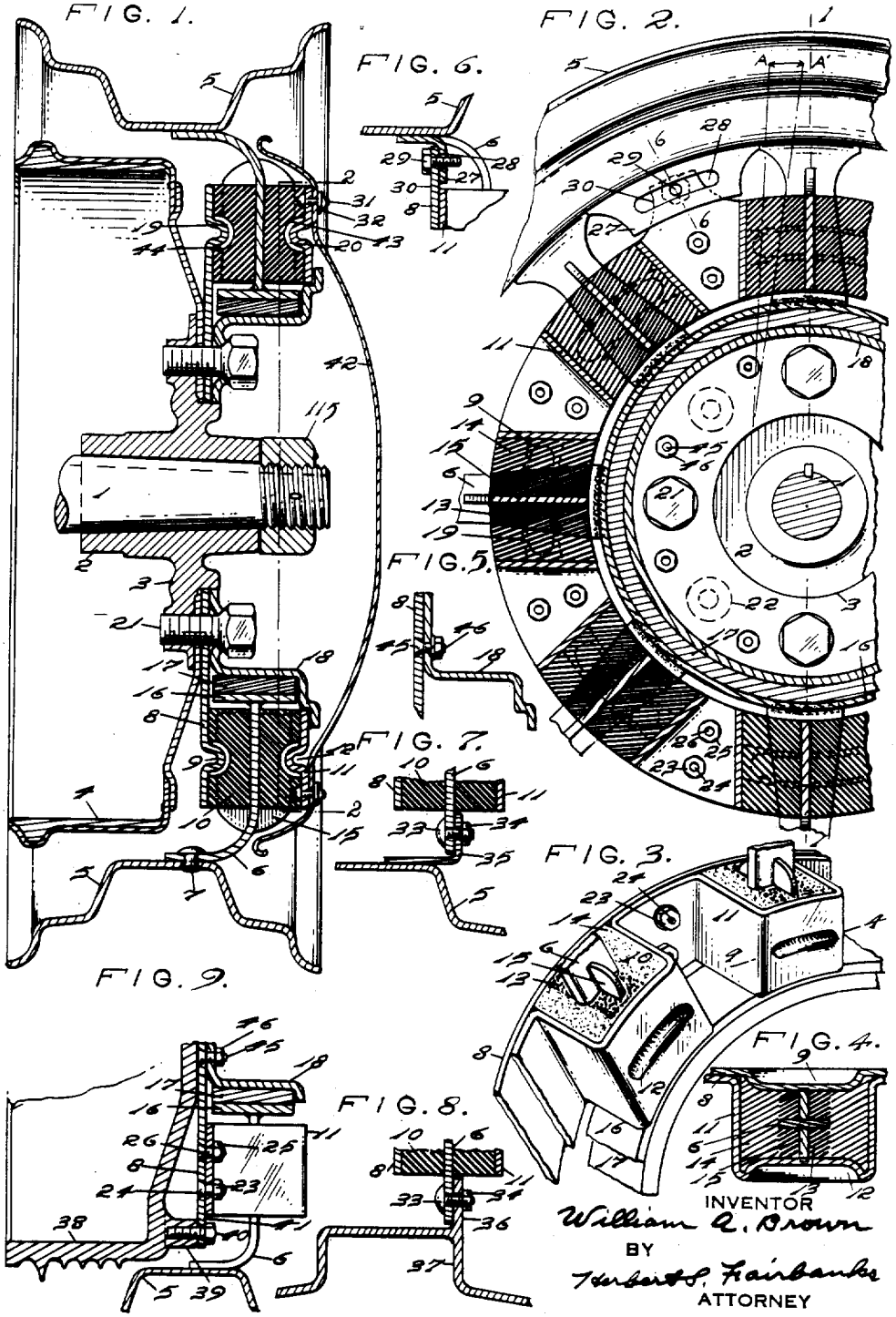
INVENTOR
William A. Brown
BY
Herbert S. Fairbanks
ATTORNEY Jan. 7, 1941. W. A. BROWN Re. 21,689
TORQUE-BRAKE SHOCK ABSORBING WHEEL
Original Filed May 3, 1938 4 Sheets-Sheet 2
FIG. 10.
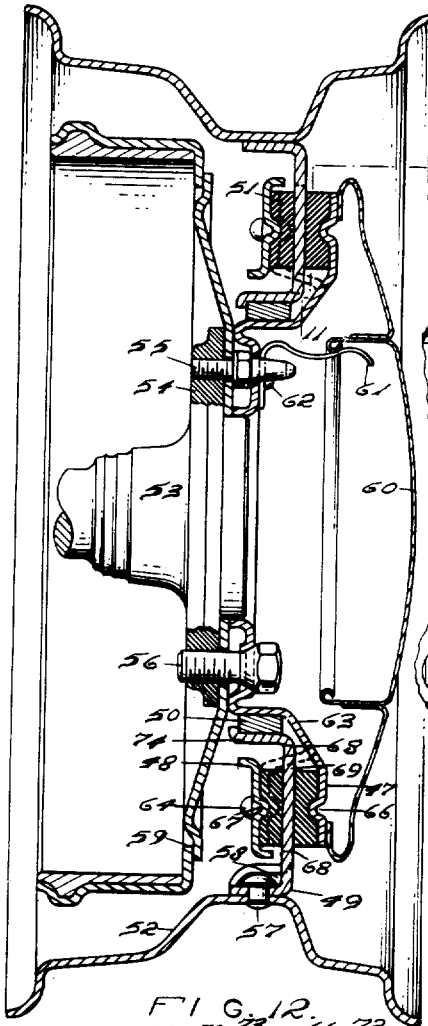
FIG. 11.
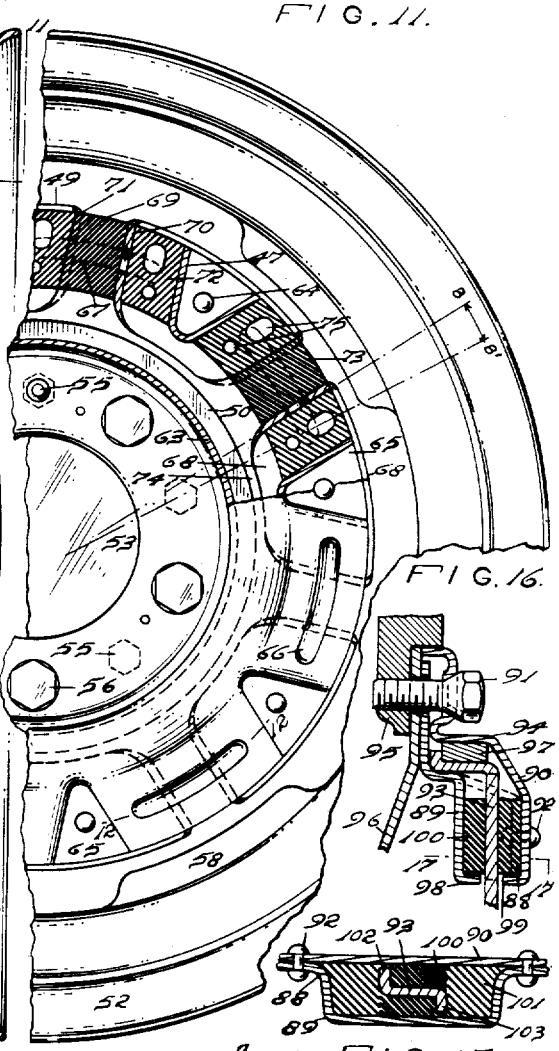
FIG. 16.
FIG. 12.
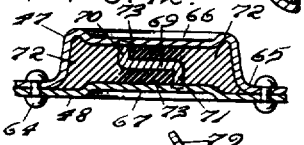
FIG. 13.
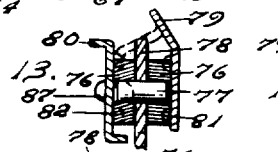
FIG. 14.
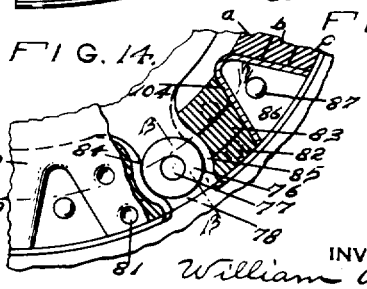
FIG. 17.
FIG. 15.
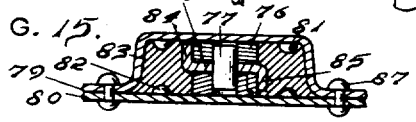
INVENTOR
William A. Brown
BY
Herbert S. Fairbanks
ATTORNEY PNEUMATIC TIRES
AND WHEELS
SEA
Jan. 7, 1941. W. A. BROWN Re. 21,689
TORQUE-BRAKE SHOCK ABSORBING WHEEL
Original Filed May 3, 1938 4 Sheets-Sheet 3
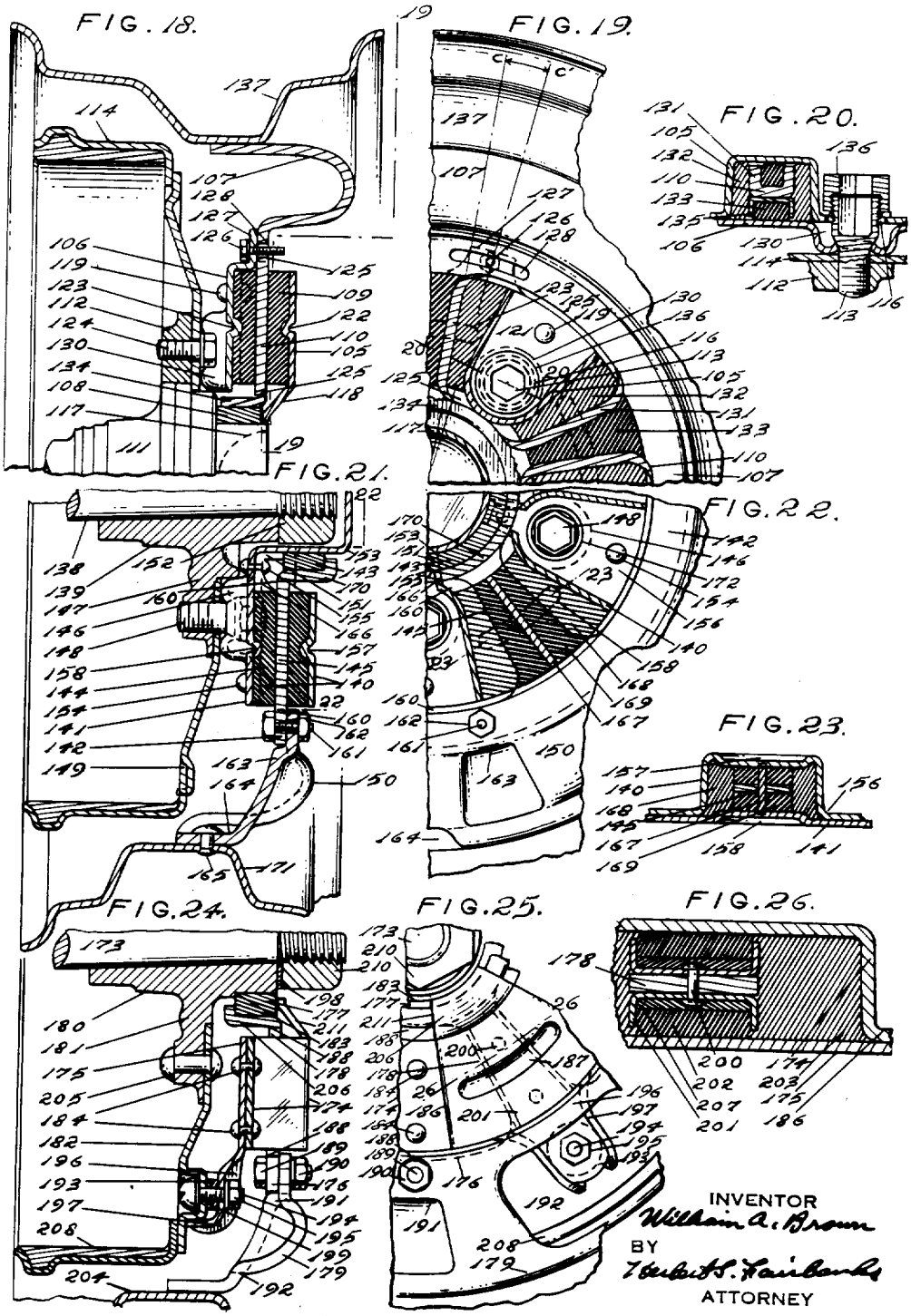
INVENTOR
William A. Brown
BY
Herbert S. Fairbanks
ATTORNEY Jan. 7, 1941. W. A. BROWN Re. 21,689
TORQUE-BRAKE SHOCK ABSORBING WHEEL
Original Filed May 3, 1938 4 Sheets-Sheet 4
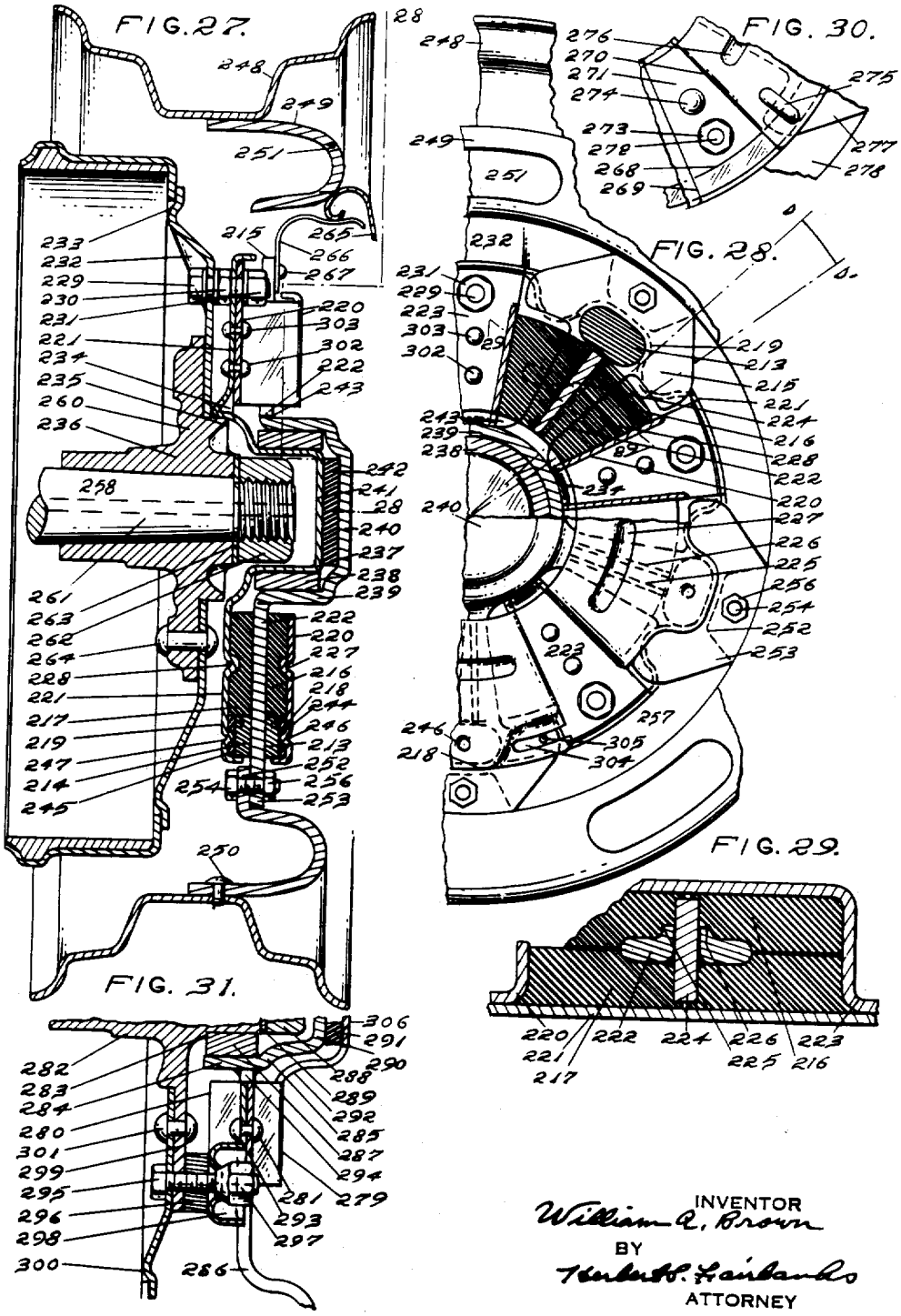
INVENTOR
William A. Brown
BY
Herbert H. Fairbanks
ATTORNEY

SEARCH RO

Reissued Jan. 7, 1941

Re. 21,689

UNITED STATES PATENT OFFICE 21,689

TORQUE-BRAKE SHOCK ABSORBING WHEEL

William A. Brown, Philadelphia, Pa.

Original No. 2,176,056, dated October 17, 1939, Serial No. 205,813, May 3, 1938. Application for reissue October 15, 1940, Serial No. 361,292

31 Claims. (Cl. 152—1)

My invention relates to vehicle wheels for use on all forms of transportation wherein means are provided for absorbing torque and brake shock.

Heretofore, torque-brake shock absorbing wheels have been too heavy or too complicated or too expensive to be commercially practical, especially for use by the automotive industry.

It is therefore the prime object of this invention to provide a commercially practical construction of a torque-brake shock absorbing wheel that is simple, foolproof, efficient, indestructible and inexpensive to manufacture on a productive basis.

A further object of this invention is to provide a construction capable of indefinitely resisting deterioration from heat, lubricant, friction, air, shock and time in order that the pre-determined shock absorbing characteristics of the wheel will remain practically unchanged, throughout the life of the device.

Another object of this invention is to provide a construction having suitable resilient means, preferably rubber, to permit intermittent, limited, relative, circumferential movement between the driving and driven members in cushioning torque-brake shock, which may be advantageously located in a common pocket with suitable bearing material, preferably noise deadening such as rubber or Bakelite, which maintains said driving and driven members in proper assembly against lateral thrust or displacement, regardless of the severity of the service involved. The number and contour of said pockets, which are circumferentially spaced, are contingent on the kind of service contemplated.

A serious defect in shock absorbing wheel constructions in the past, has been the lack of lateral stability, that is, they did not have adequate rigidity in the lateral direction such as is contemplated in the present invention. It is therefore another object of this invention to provide a construction in which the bearing material employed to resist lateral thrust has distinctly different operating characteristics from the cushioning or resilient material employed, even if and when both of said materials are joined in one piece and are located in a common pocket.

A further object of this invention is to provide a construction employing suitable means for maintaining indefinitely the composite cushioning-bearing members in assembled position in their common pocket, in relation to each other and to the adjacent parts.

A further object of this invention is to provide a construction that will remain practically concentric under all normal operating conditions. This is especially necessary in automotive service since the modern low pressure pneumatic tire cushions road-load shock, and any eccentric action in the wheel proper is a serious problem and to be avoided.

Another object of this invention is to provide a construction that can be balanced to an extent comparable with standard stiff wheel practice as required for satisfactory automotive use.

A further and important object of this invention is to provide a torque-brake shock absorbing wheel which may be detached from or attached to the vehicle in its assembled state as a unit of structure by any person anywhere, with the simplest of tools, and which is immediately interchangeable, for automotive transportation, with any standard non-resilient or stiff wheel.

Another object of this invention is to provide a torque-brake shock absorbing wheel which may be immediately attached to and detached from a standard brake drum as a unit of structure whenever mounting means are present to receive a conventional wheel or rim, and the usual automotive hub type mounting is dispensed with.

A further object of this invention is to provide a construction that may be converted immediately from shock absorbing operation into standard stiff wheel operation, in the event of a breakdown or for any other reason, by any person anywhere with the simplest of tools.

A further and prime object of this invention is to provide a construction with special means to permit immediate mounting and demounting of the conventional automotive rim without touching the regular means employed for attaching and detaching the assembled wheel structure, to or from the vehicle, thereby removing the necessity of changing complete wheels in the event of tire collapse in automotive service and more particularly eliminating the need of a spare wheel and also permitting the use of torque-brake shock absorbing wheels on the driving axle and standard stiff wheels on the driven axle, which is vitally important under certain operating conditions. Many automobile owners could not enjoy the economies of torque-brake shock absorbing wheel operation on the driving axle if they had to buy four such wheels or had to carry spare wheels of both types.

Another object of this invention is to provide a construction in which an annular integral or segmental bearing of the proper hardness and composition, which may or may not be lubricated and which is preferably of rubber or Bakelite because of their noise deadening characteristics and the advisability of avoiding all metal to metal contacts, is used to permit circumferential movement against radial load under permanent concentric operation of the wheel.

A further and vitally important object of this invention is to provide a construction simple and efficient enough to permit of the economical use of synthetic rubber compounds, in the manufacture of either the resilient means or the bearing means employed or both, notwithstanding the higher costs of this material over ordinary rubber compounds. The remarkable resistance to friction, heat, lubricant, and aging of synthetic rubber compounds, such as chloroprene and butadiene-sodium, make this material peculiarly desirable in the production of a commercially practical torque-brake shock absorbing wheel, for certain services.

In the past, rubber under compression has been condemned and often discarded as unsuited for use in shock absorbing wheels because of premature disintegration in cushioning the blow in the absence of means to prevent abnormal stresses being imposed on certain portions, especially in dampening torque-brake shock through circumferential movement. The various attempts to solve this problem have usually involved the use of excessive quantities of resilient material which resulted in too much weight and a prohibitive cost. It is therefore an important object of this invention to provide a construction in which a minimum of resilient material will operate under maximum efficiency through the proper design of co-operating parts to insure uniform pressures throughout the predetermined area of said resilient material by providing gradual increases in resilient action, as the distance from the axis of the axle shaft increases, to compensate for the increase in the stresses imposed as the movement widens with every increase in radius. Unless adequate means are provided in the construction of the co-operating parts to insure consistently uniform pressures radially on the resilient material, pinching and breakdown may occur of those portions cushioning a disproportionate share of the shock.

A further and prime object of this invention is to provide a construction in which the cushioning-bearing members employed are located adjacent to the vehicle axle shaft at the hub to avoid any operating problem resulting from centrifugal forces, which might be set in motion, should additional weight be placed near the periphery of the wheel. My construction has the advantages claimed for flexible hubs minus their well known complications, in that I attach and detach the complete wheel structure without touching a thing on the standard axle-hub precision assembly. In other words, the quick demountable, interchangeable feature of my construction is retained in its entirety.

A further object of this invention is to provide a construction of the utmost stability regardless of the amount of resiliency provided in cushioning torque-brake shock.

With the above and other objects in view, as will hereinafter appear, my invention comprehends a novel torque-brake shock absorbing wheel.

Other novel features of construction and advantage will hereinafter more clearly appear in the detailed description and the appended claims.

For the purpose of illustrating the invention I have shown in the accompanying drawings, typical embodiments of it, which, in practice, will give reliable and satisfactory results. It is, however, to be understood that these embodiments are typical only, and the various instrumentalities of which my invention consists can be variously arranged and organized, and the invention is not limited to the precise arrangement and the organization of these instrumentalities as herein set forth.

Figure 1 is a sectional elevation of a torque-brake shock absorbing wheel, embodying my invention, the section being taken substantially on line 1—1 of Figure 2.

Figure 2 is a section on line 2—2 of Figure 1.

Figure 3 is a perspective view showing more particularly the construction and arrangement of the pockets.

Figure 4 is a sectional view, the section being taken substantially on line 4—4 of Figure 3.

Figure 5 is a sectional detail showing the manner in which the annular bearing support is attached to the inner abutment, to complete the wheel assembly.

Figure 6 is a sectional view, the section being taken substantially on line 6—6 of Figure 2.

Figure 7 is a sectional view of another embodiment of the invention, showing more particularly a quick detachable rim.

Figure 8 is another embodiment of the invention showing another form of a quick detachable rim.

Figure 9 is a sectional elevation of another embodiment of my invention wherein the entire assembled wheel structure is attached to the brake drum instead of the hub.

Figure 10 is a sectional elevation of another embodiment of my invention.

Figure 11 is a partial side elevation and a partial section, the section being taken on line 11—11 of Figure 10.

Figure 12 is a section taken substantially on line 12—12 of Figure 11.

Figure 13 is a sectional view of another embodiment of the invention, the section being taken substantially on line 13—13 of Figure 14.

Figure 14 is a face view partly in section showing more particularly a different construction and arrangement of bearing members, for taking care of lateral thrust.

Figure 15 is a section taken substantially on line 15—15 of Figure 14.

Figure 16 is a sectional elevation of another embodiment of my invention wherein the recesses that contribute to the formation of the circumferentially disposed pockets are formed in the inner abutment.

Figure 17 is a section on line 17—17 of Figure 16.

Figure 18 is a sectional elevation of another embodiment of the invention.

Figure 19 is a section on line 19—19 of Figure 18.

Figure 20 is a sectional detail of a mounting, seen in Figure 19, on section line 20—20.

Figure 21 is a sectional elevation of another embodiment of the invention.

Figure 22 is a section substantially on line 22—22 of Figure 21.

Figure 23 is a section on line 23—23 of Figure 22.

Figure 24 is a sectional elevation of another embodiment of the invention.

Figure 25 is a side elevation of Figure 24.

Figure 26 is a section, on an enlarged scale, taken substantially on line 26—26 of Figure 25.

Figure 27 is a sectional elevation of another embodiment of the invention.

Figure 28 is a side elevation, partly in section, of Figure 27.

Figure 29 is a section, on an enlarged scale, taken substantially on line 29—29 of Figure 28.

Figure 30 is a detailed view of another embodiment of the invention.

Figure 31 is a sectional elevation of another embodiment of the invention.

Similar numerals of reference indicate corresponding parts.

Referring to the drawings:

1 designates a rear axle to which the flanged hub 2 is keyed and which is held in rigid assembly by the conventional axle nut 115. The flange 3 of the hub 2 carries a conventional brake drum 4, which is rigidly attached to said flange 3 by any suitable means such as the rivets 22. 5 designates a standard drop center rim, as used with pneumatic tires, which is attached to the driven members 6 by means of the fastening devices 7 such as, for example, the rivets seen in Figure 1.

8 designates an inner abutment, which is also the driving member. 9 is a recess formed in the inner abutment 8 to hold the composite cushioning-bearing member 10, which has the corresponding recess 19, in its assembled position under all operating conditions. 11 is an outer abutment having a recess 12, similar to the recess 9, that co-operates in keeping the composite cushioning-bearing member 10, which also has the corresponding recess 20, in its assembled position. It is to be understood, however, that under certain conditions, any one or all of these recesses may be dispensed with or modified, such as, for example, in the event that either portion of the cushioning-bearing member 10, which is preferably of rubber, should be vulcanized to the driven member 6 in the case of the bearing portion, or to one or both of the abutments 8 and 11 in the case of the cushioning portion, or in the event that the abutments 8 and 11 are provided with flanges in close proximity to the member 10 and projecting inwardly towards the member 6.

It will be understood by referring to Figures 1, 2, 3, and 4 that the outer abutment 11 is of such shape and contour as to form, in conjunction with the inner abutment and driving member 8, a series of circumferentially spaced pockets of any desired cross section, within which is disposed the composite cushioning-bearing member 10, comprising two distinct sections, preferably as already stated of rubber, with those portions 13 on either side of the driven member 6 of a compound having high abrasive resisting qualities to permit intermittent circumferential movement, without wear in the absence of lubricant, of the driven member 6 in relation to the driving member 8 in dampening torque-brake shock through the cushioning portion 14, which is of a compressible compound to allow any desired elasticity required to properly cushion the blow. Since the relative circumferential movement between the driving member 8 and the driven member 6 is limited and intermittent, the surface of the bearing portion 13 in contact with the walls of the inner and outer abutments 8 and 11, can be permanently lubricated, if desired, with one of the special lubricants recently developed for use with rubber compounds, where continuous movement under pressure is absent.

It will be noted that the driven member 6 is preferably in the shape of a spoke rigidly held in an upright position, against lateral thrust or displacement, between the bearing portions 13 of the composite cushioning-bearing member 10. It will also be seen that the driven member 6 has the right angle insert 15 substantially its entire length to obtain maximum compression in either direction, through the bearing portions 13 of the resilient portion 14 of the composite cushioning-bearing member 10. The width, length and position of this insert 15, which has the cut outs 43 and 44 corresponding to the recesses 9 and 12, may be different for each application, depending on the severity of the torque-brake shock to be checked plus the amount of reinforcement needed for each driven member or spoke 6 which is, of necessity, subject to limitations with regard to its width and thickness.

As already stated, in many cases in practice, it will be advantageous to vulcanize the bearing portions 13 of the composite cushioning-bearing member 10, if it is made of rubber, to the driven member 6 and to the insert 15 to obtain maximum bearing efficiency in both directions during circumferential movement of the driven member 6. This is especially true in view of the large amount of surface available for the rubber to adhere to, on the combined driven member 6 and the insert 15.

If the insert 15 is welded to the driven member or spoke 6 said member automatically becomes many times stronger. In the event that the vehicle to which the wheel is to be attached is very light in weight and is driven by an engine of low horsepower, the insert 15 or its equivalent may be dispensed with.

The inboard end of each of the driven members or spokes 6 are permanently attached by welding or other suitable means to make them integral with the annular ring 16, which acts as a rigid support for the integral or segmental annular bearing 17, which is preferably of a non-metallic material such as rubber, Bakelite, etc. having noise deadening characteristics. As in the case of the bearing portion 13 of the composite cushioning-bearing member 10, this annular bearing 17 may be impregnated with a suitable permanent lubricant to minimize friction. It has, however, been found desirable to have a moderate friction condition present in both the annular bearing 17 and the bearing portion 13 of the member 10, to slow up the movement of the driven members 6 in returning to their normal position in relation to the inner abutment or driving member 8 and the outer abutment 11. In certain instances where the relative intermittent circumferential movement between the driving member 8 and the driven member 6, in absorbing torque-brake shock, is extended sufficiently to offer the possibility of a frictional heat condition arising, then in such case the annual bearing member 17 should preferably be permanently lubricated with graphite or other suitable material, and in certain instances may be made of metal, if noise is of no importance.

The annular support 18 which acts as a seat for the bearing 17 and in certain instances as a reinforcement for the outer abutment 11, is held in permanent relation to the driving member 8 by means of the bolts 45 and the nuts 46 as shown in Figure 5. It will thus be seen from Figures 1 to 5, that the entire assembly of my shock absorbing wheel can be instantly applied to any conventional automobile hub 2, at the regular mounting holes of the flange 3 by means of the standard bolts 21, to permit immediate interchangeability between my shock absorbing wheel and any standard stiff wheel.

The cover 42 which is of any desired shape or size, is held in position on the outer abutment 11 by means of the bolts 31, and the nuts 32, but may be assembled in any conventional manner now employed on similar stiff wheels.

Figure 2 clearly shows the preferred shape of the driven members 6, and the position of the inserts 15 on said driven members 6. The preferred position and shape of the recesses 9 in the driving member 8 are also clearly indicated in dotted outline. The bolts 24 and 26, having the nuts 23 and 25, rigidly hold the outer abutment 11 to the inner abutment or driving member 8. While the bolts 24 and 26 are shown, it is to be understood that the inner and outer abutments 8 and 11 may be permanently riveted together, if desired.

It will be noted in Figure 2 that the spokes or driven members 6 gradually become wider as the radius shortens, in order to maintain uniform pressures throughout the entire area of the resilient or cushioning portions 14 when circumferential movement occurs, under torque-brake shock, as indicated along line A—A'. It will also be noted that this design of the spokes or driven members 6, provides additional space for the important bearing portions 13 where contact occurs with both the inner and outer abutments 8 and 11, without affecting the shape or contour of the resilient portion 14 to obtain maximum efficiency with a minimum amount of material.

*Converting shock absorbing wheel into stiff wheel*

Since these shock absorbing wheels should only be used on the driving axle of the vehicle, which on most automobiles is the rear axle, and since interchangeability with the convention stiff wheel is one of the features of my construction, it may be desirable to provide a simple means for converting a torque-brake shock-absorbing wheel into a stiff wheel in the event of a breakdown or for any other reason, such as pneumatic tire collapse, and a replacement is necessary and the only thing available is the standard stiff wheel.

In such an emergency, the locking arrangement shown at the top of Figure 2 will be adequate. As will be seen, the ear 27, having a slot 28, is formed as a part of the two adjacent driven members 6. The inner abutment or driving member 8 likewise has an ear 30, on which is permanently mounted a threaded bolt 29, which freely moves from side to side in a slot 28 as the resilient portions 14 of the composite cushioning-bearing member 10 absorbs torque-brake shock. To stop all circumferential movement in both directions, merely requires the attaching and tightening of a special nut on the exposed threaded end of the bolt 29, and my torque-brake shock absorbing wheel is immediately converted into a stiff wheel, an operation so simple that any person can do it as will be understood from Figure 6. The number of such locks to a wheel will depend on the weight of the vehicle and the horsepower of the engine used. Likewise in many instances these locks can be dispensed with entirely.

Figures 3 and 4 clearly show the relation of the cushioning resilient portions 14 and the bearing portions 13 of the composite cushioning-bearing members 10, to the driven member of spoke 6 and the insert 15. It will be seen that the bearing portions 13 are firmly seated against the inner and outer sides of the driven member 6, and, in combination with the adjacent wall of the inner abutment 8 and the outer abutment 11, act to permanently maintain the driven member 6 in an upright or perpendicular position against lateral thrust or displacement, without interfering with the movement of the driven member 6 in either circumferential direction in cushioning torque-brake shock. The action of the insert 15 in providing maximum compression of the resilient portion 14 as well as offering a greatly increased surface to adhere to, if the bearing portions 13 are of rubber and are to be vulcanized to the driven member 6, will also be understood from Figures 3 and 4. The method of rigidly assembling the inner abutment 8 and the outer abutment 11, to form a series of circumferentially spaced pockets is also clearly shown in Figures 3 and 4. The preferred position of the recesses 12, which, with the recesses 9, act to hold the composite cushioning-bearing members 10 in their assembled position under all operating conditions are also shown in Figures 3 and 4.

One of the features of the present construction is the provision for permitting free unrestricted movement of the resilient portions 14, of the composite cushioning-bearing member 10, under high compression. It will be noted from Figures 1, 2, 3, 6, 8 and 9, that there are no tight fitting closures at the inboard and outboard ends of the pockets holding the cushioning-bearing members 10. In other words, as the uniform compression of the resilient portions 14 increases, ample space is always present in which to permit this material to expand without losing any of the predetermined resistance to the severest blow, yet, at the same time, said resilient portions 14 are not subjected to a disintegrating action or strain as has often been the case in constructions of this type wherein no provision was made to insure uniform pressures throughout the entire area of the resilient material and to permit this resilient means to move freely into neutral positions as it was subjected to varying pressures in dampening the torque-brake shock.

*Quick detachable rim mounting*

Since, in practice, it has been found desirable to mount torque-brake shock absorbing wheels only on the driving axle of the vehicle, as already stated, which will require the use of standard stiff wheels on the driven axle, and since the use of two such distinctly different types of wheels on the same vehicle may present serious complications in the event of a tire collapse on either type on the road, I have provided the constructions shown in Figures 7 and 8. It will be noted in Figures 7 and 8 that, because of the commercially practical manner in which I employ the driven member or spoke 6, I am able to so arrange said driven member 6 that it will afford a simple rigid mounting for a quick detachable rim provided with the special annular driving flange 35, by merely having several circumferentially spaced holes in said flange 35 to coincide with the desired number of bolts 33, that are permanently attached to the driven member 6, as shown, so that a breakdown of any kind that will require the immediate replacement of the rim 5 and its adjuncts can be made without touching the wheel proper.

It will merely require the removal of the nuts 34 to instantly lift the rim 5, with its flange 35, off the driven member 6 to be replaced with a similar inexpensive rim that can be slipped into position on the bolts 33 and rigidly positioned with the same nuts 34. A matter of a few min-

SEARCH R utes work for even a woman. In this simple way, the problems that are bound to arise through the preferred use of two distinct types of wheels on the same vehicle, torque-brake shock absorbing on the driving axle and ordinary stiff on the driven axle, are definitely eliminated, and the expense and trouble of carrying replacement wheels or even a single wheel of either type is completely removed.

Figure 8 shows a construction similar to that disclosed in Figure 7. In Figure 8, the annular driving flange 36 is integral with the rim 37, being rolled into it during the same operation that forms the rim proper.

*Attaching wheel to brake drum*

Figure 9 is a modification of the construction disclosed in Figure 1, wherein the inner abutment or driving member 8 has the annular flange 41 with a number of circumferentially spaced holes to coincide with the drilled and tapped bosses 39 on the brake drum 38. One object of this construction is to provide additional resistance to lateral stresses in heavy duty service, that might tend to press the entire wheel structure out of position with relation to the axle 1, shown in Figure 1. In this construction, the flange 41 is rigidly held in position on the brake drum 38 by means of the bolts 40. It will be seen that the annular support 18 does not reinforce the outer abutment 11 as shown in Figure 1 since any need for such a reinforcement is eliminated when the inner abutment 8 is rigidly attached to the brake drum 38.

Attention is directed to the fact that the use of the mounting disclosed in Figure 9 will permit of the important and complete elimination, in many instances where desired, of the mounting shown in Figure 1 for attaching my wheel to the vehicle. All mounting and dismounting may be accomplished exclusively by the use of the simple, practical means shown in Figure 9, which is possible because of the novel general construction I have disclosed. This mounting, irrespective of whether the brake drum and hub are in two pieces or are integral, is more stable because of its larger and stronger bolting circle.

It is to be understood that in all of the foregoing embodiments of my invention, the bearing portions 13 of the composite cushioning-bearing member 10 are in tight contact with the spoke or driven member 6 and the adjacent walls of the inner abutment 8 and the outer abutment 11, to resist lateral thrust and possible displacement of said driven member 6, regardless of the service involved. It is to be further understood that said bearing portions 13 may be of any suitable bearing material but are preferably of rubber or Bakelite of the proper hardness or composition to give satisfactory noiseless operation, and may be permanently lubricated if desired. It is further understood that said bearing portions 13, if made of rubber, may or may not be permanently vulcanized to the driven member 6, by the most suitable method known.

It is further understood that the recesses 9 in the inner abutment 8 and the recesses 12 in the outer abutment 11 as shown in Figures 1, 2, 3 and 4, not only serve to maintain the cushioning-bearing member 10 in its assembled position under all operating conditions but they also act to reinforce and stiffen the pocket walls of the inner and outer abutments 8 and 11 against distortion from lateral thrust and in many instances will permit of the economical use of lighter materials in their manufacture.

It is further understood that in all of the foregoing embodiments of my invention, the separate annular integral or segmental bearing 17 is preferably of a suitable non-metallic, noiseless material such as rubber, Bakelite, etc., permanently lubricated if desired. It is further understood that said annular bearing 17 is used to permit unrestricted, circumferential movement against radial load under permanent concentric operation of the wheel.

It will also be understood from Figure 2, that approximately uniform pressures can be maintained throughout the area of the resilient material, during the entire circumferential movement of either the driven or driving member in cushioning torque-brake shock, by adjusting the contour of said driven or driving member and resilient material radially to compensate for every increase in circumferential movement, as the radius increases. In other words, if approximate control of the ratio of compression stress to compression strain is achieved as described above, when rubber is the resilient material employed, premature disintegration from mechanical forces will be avoided.

In Figure 10, I show a commercially productive construction of my torque-brake shock absorbing wheel for use on a 38—60 Buick, in which only three simple inexpensive stampings, the outer abutment or driving member 47, the inner abutment 48 and the driven member 49, are employed in conjunction with the annular bearing 50, the composite cushioning-bearing member 51 and the standard rim 52, to produce a complete wheel ready for continuous, satisfactory service.

In this commercially productive construction the hub 53 has the conventional flange 54 which is drilled and tapped to receive the standard brake drum bolts 55, and the separate standard wheel attaching bolts 56 to permit instant mounting and demounting of the completely assembled wheel without touching anything connected with the brake drum 59, or, more particularly, to permit immediate interchangeability between my torque-brake shock absorbing wheel and the standard stiff wheel for replacement purposes, if and when desired.

The driven member 49 of Figure 10 is permanently attached to the rim 52 by means of the rivets 57, or their equivalent. The size and number of ventilating holes 58 in the driven member 49 will depend on the amount of brake drum heat dissipation required. The annular bearing 50 is similar to the same member shown in Figure 1. The cover 60 is quick detachable and held in position by means of the curved prongs 61 which are permanently held on the annular extension 63 of the outer abutment 47 by the rivets 62.

In the construction shown in Figure 10, the circumferentially disposed pockets to hold the composite cushioning-bearing member 51 are formed in the same manner as disclosed in Figures 1, 2, 3 and 4 except that the outer abutment 47, is the driving member and has the annular extension 63 to support the integral or segmental annular bearing 50, which is preferably of rubber or Bakelite to deaden noise and which may or may not be lubricated, as desired. The inner abutment 48 and the outer abutment or driving member 47 are rigidly held together by the rivets 64 located in the main recesses 65 of the outer abutment 47 as will clearly be understood from Figure 11. The recesses 66 in the outer abutment 47 and the recesses 67 in the inner abutment 48 are similar to those shown in Figures 1, 2, 3, and 4, and serve the same purpose of maintaining the cushioning-bearing member 51 in its assembled position under all operating conditions, and reinforcing said abutments against distortion du ing excessive lateral stress.

The driven member 49 has the circumferentially disposed cut outs 68 to receive the main recesses 65 of the outer abutment or driving member 47 that contact the inner abutment 48 to form the pockets for the composite cushioning-bearing member 51. It will be noted that the spokes 69 are located between the cut outs 68 and are integral with the driven member 49 and preferably have the reinforcing flanges 70 and 71 as clearly shown in Figures 11 and 12, which perform the same function as already described for the insert 15 of Figure 1, namely to obtain maximum efficiency directly from the resilient portion 72 and indirectly through the bearing portion 73 of the composite cushioning-bearing member 51, as the driven member 49 moves in either direction circumferentially, in relation to the driving member 47, in cushioning torque-brake shock. If the bearing portions 73 are of rubber, the flanges 70 and 71 materially add to the surface to which said bearing portion can be vulcanized, if desired, for greater efficiency as already described for the driven member 6 and the insert 15 of Figure 1.

*Wheel remains concentric and balanced*

The annular bearing seat 74 which is integral with the spokes 69 of the driven member 49, and the extension 63 of the driving member 47 jointly act to hold the separate annular bearing 50 in its assembled position, and, more particularly, to permanently resist any tendency to eccentricity in the wheel under radial load, in exactly the same manner as the annular ring 16, the annular support 18 and the annular bearing 17 of Figure 1 co-operate to obtain the same result. As already stated, one of the principal objects of this invention is to provide a construction that will remain substantially concentric in all normal service since any tendency towards eccentricity is likely to produce an unbalanced condition and plenty of trouble in the operation of the vehicle, especially a pleasure automobile where wheel balance is important.

The desire or need for eccentric movement in a wheel of this type for automotive service has been thoroughly and completely removed by the universal use of large cross section, low pressure, pneumatic tires for absorbing all road-load shock. Because of the combination of more powerful engines and more and more automatic operation, involving finely adjusted complicated parts requiring greater protection against shock, the increasingly serious problem in automotive service is torque-brake shock.

Figure 11 clearly shows the relation of the main recesses 65 to the spokes 69 which are adjacent to the cut outs 68 and act to connect the rim portion of the driven member 49 with the annular bearing seat 74. The preferred position and shape of the recesses 66 in the outer abutment 48 and their relation to the recesses 67 in the inner abutment 48 and their relation to the main recesses 65 will be understood from Figure 11, as well as their similarity to the construction shown in Figures 1 and 2.

In Figure 11, I employ a series of cavities or holes 75 in the resilient portion 72. These cavities, as will be noted, increase in size as the distance from the wheel center increases. It is the object of this construction to maintain uniform predetermined pressures throughout the area of said resilient portions 72, under torque-brake shock, comparable to the construction shown in Figure 2. Since the circumferential movement widens with each increase in radius and since the spoke 69 and the resilient portions 72 are substantially parallel with each other radially, the pressure at the outboard end will be greater in the absence of suitable means to compensate for this difference in movement. By varying the size of the cavities 75 with the radius, stress and strain may be controlled within certain limits and premature disintegration of certain areas, because of excessive mechanical forces, avoided. In many instances in practice a single radially disposed cavity or hole can be used and said cavity or cavities may be of any desired form or area to secure the proper resilient action.

Figure 12 shows more fully the preferred size, shape and position of the reinforcing flanges 70 and 71 of the spokes 69 and their relation to the surrounding composite cushioning-bearing member 51, with its resilient portions 72 for absorbing torque-brake shock and its rigid bearing portions 73 in close contact with the side walls of the spoke 69 and the adjacent walls of the outer abutment 47 and the inner abutment 48, to resist lateral thrust or displacement under all operating conditions and without interfering with the circumferential movement of the spoke 69 in either direction in cushioning torque-brake shock.

Figures 13, 14 and 15 show a modification of my construction wherein the bearing portions 76 of the composite cushioning-bearing member are made in the shape of a ring, preferably with a center hole to receive the plug 77, which passes through the inner and outer sections of the bearing as well as the spoke 78 to maintain said bearing sections in their assembled position in relation to the spoke 78 and the adjacent walls of the outer abutment or driving member 79 and the inner abutment 80, which are similar to the same members already described for Figure 10. The principal object of this embodiment is to provide a cheap, simple, foolproof means to enable the use of Bakelite, metal or other suitable bearing material, permanently lubricated if desired, as the bearing portions 76. As will be understood from Figures 13, 14 and 15, the recesses 66 and 67 of Figure 10 are replaced with the inwardly projecting knobs 81 and 82, or their equivalent, which press into the resilient portions 83 of the cushioning-bearing members to keep them in their assembled position, without interfering with the circumferential movement of the bearing portions 76, under torque-brake shock. The spoke 78 and its reinforcing flanges 84 and 85 are formed to the contour of the bearing portion 76 to relieve the plug 77, which may be dispensed with in certain services, of most of the pressure against the bearing portion 76 in its circumferential movement in either direction. The main recess 86 and the rivets 87 are similar to those shown in Figures 10 and 11.

The resilient portion 83 shown in Figure 14, is composed of laminated segments, *a*, *b*, and *c*, joined together, by vulcanization or its equivalent if rubber is used, with each segment having the proper characteristics to insure approximately uniform resilient action under torque-brake shock. In this embodiment because the

SEARCH R spoke 78 is curved outwardly and the wall 104 of the main recess 86 in the outer abutment 79 is substantially parallel at its inboard and outboard ends with said spoke 78, compression stress and strain will be greatest on segment *b* and least on segment *a*. To compensate for this variation in pressures it is proposed to use different compositions of resilient material for each segment to assure a uniform resilient action without adjusting the contour of the spoke 78, the wall 104 or the resilient portion 83, singly or in any co-operative combination, to take care of each increase in circumferential movement, as the radius increases.

Figures 16 and 17 are another embodiment of my invention wherein the main recesses 88 are formed in the inner abutment 89 instead of the outer abutment 90 as disclosed in Figures 10 and 11. In this modification, the inner abutment 89 extends inboard beyond the standard attaching bolts 91, and, in addition to the rivets 92, may also be rigidly held to the outer abutment 90 in a manner similar to that disclosed in Figure 5. In this construction, the inner and outer abutments 89 and 90 co-operate to resist lateral displacement of the assembled wheel in much the same manner and with the same advantages as already described for the construction disclosed in Figures 1 and 10, with the extension 94 of the outer abutment 90 replacing the separate support 18 of Figure 1. The hub flange 95, the brake drum 96, and the annular bearing 97 of Figure 16 are the same as already described for Figure 10. It will be noted that there are no inner and outer recesses shown in Figures 16 and 17 for maintaining the composite cushioning-bearing member in assembly as it is thought that in certain instances, centrifugal action plus the close fitting flanges 98 and 99 will take care of this function satisfactorily.

The relation of the bearing portions 100 to the spoke or driven member 93 and the resilient portions 101 to both the spoke and the adjacent walls of the inner and outer abutments 89 and 90, as well as the purpose of the reinforcing flanges 102 and 103 of the spoke 93 will be clearly understood from Figure 17, in view of their similarity to the corresponding parts of Figures 4 and 12.

The axle, hub, hub flange, wheel mounting radius and bolts co-operating with said mounting, including their number and position circumferentially, brake drum and rim, shown in Figures 10 and 11, are reproduced from a 1938 Buick production layout, with each part and figure drawn to an approximate scale of ½ to 1.

*Uniform resilient action*

In Figures 19, 22 and 25, I show preferred embodiments of my construction to provide relatively uniform resilient action, under torque-brake shock, throughout the area of the resilient material, by tapering the spoke portions and their adjuncts, the resilient material, and the walls of the pockets, radially, to equalize compression stress, which is the force per unit actual cross sectional area, and compression strain, which is the ratio of the deflection to the original thickness.

As will be readily understood from Figures 19, 22 and 25, with each increase or decrease in radius there is an increase or decrease in circumferential movement under torque-brake shock, and unless adequate, correct and stable means are present to compensate for every change in circumferential movement as the radius increases or decreases, premature disintegration of the resilient material from mechanical forces is likely to occur because of abnormal pressures imposed on certain limited sections.

It will therefore be apparent from Figures 19, 22 and 25, that when I provide a gradual increase or decrease in resilient action as the radius increases or decreases to compensate for each increase or decrease in circumferential movement under torque-brake shock, I also provide a practical means for obtaining maximum efficiency with a minimum of resilient material, and a corresponding saving in weight and cost, such as was not contemplated heretofore. The small area available in the conventional pleasure automobile wheel towards its center, because of the substantial amount of space required for the standard wheel attaching bolts 113 and 148 which are necessarily located in the plane of the inboard portion of the resilient material, prohibits the satisfactory operation of rubber under compression in this vitally important area unless effective uniform resilient action, such as the constructions I disclose in Figures 19 and 22 provides for, is employed, or an impractical reduction in circumferential movement under torque-brake shock, is contemplated.

In Figures 18, 19, 21 and 22, I show preferred embodiments of my invention wherein the driving and driven members and their adjuncts have been moved inboard into the limited area towards the wheel center without any loss of the amount of resilient action or circumferential movement under torque-brake shock, contemplated for the construction shown in Figures 10 and 11, with its larger radius and much greater area and which is not handicapped by having wheel mounting bolts in the plane of the resilient material. By tapering the spoke portions of the driven member and their adjuncts, the resilient material, and the walls of the pockets inwardly along identical lines radially and originating from a common point at the wheel axis, which is the simplest and most logical way to secure substantially uniform resilient action throughout the area of the resilient material, I automatically solve the problem of producing a commercially practical construction without disturbing standard wheel mounting design because the narrowest section of my operating assembly is adjacent the area occupied by standard wheel mounting bolts.

In moving my operating assembly into the area towards the wheel center, I also automatically reduce and minimize the problem of centrifugal action which has always been a serious handicap with shock absorbing wheels for automotive service, because of the general practice of having large segments of resilient material towards the outboard section of the wheel, with a resultant, objectionable, unbalanced, centrifugal action occurring at high speeds.

If rubber under compression is the resilient material used to cushion shock and it is placed towards the outboard section of the wheel in proximity to the periphery of the brake drum, premature deterioration because of continued high heat absorption, especially during warm weather and under certain other operating conditions when excessive heat is generated in the brake shoe and brake drum lining, is inevitable, even if synthetic rubbers are used. I therefore automatically reduce and minimize this equally serious problem when I move the operating assembly of my construction into the area towards the wheel center and away from the brake shoe and brake lining of the braking mechanism of an automobile, which is commercially practical through the effective use of the relatively uniform resilient action throughout the area of the resilient material, already described. Attention is directed to the fact, that unlike the so-called flexible hub, which is usually integral with the hub, which in turn has a large area of contact with the brake drum when it is not integral with it, by which a considerable amount of the heat generated by the brake shoe and the brake lining finds its way to the hub to adversely affect the resilient material used, especially if it is rubber, my construction is in contact with the hub and brake drum at only the five regular wheel mounting points and each such contact is what is known as a line contact or a point contact, with the chances negligible of heat transfer to my construction by contact.

When I combine the uniform resilient action described above with the wheel mounting on the brake drum disclosed in Figures 24 and 25, it is possible to obtain a considerable increase in resilient action or circumferential movement under torque-brake shock, because I am then able to remove the large standard bolts 113 and 148, from the plane of the inboard portion of the resilient material to increase the available area at the wheel center by at least 25%. This mounting is important, for it permits me to build a commercially practical construction towards the wheel center to handle a wide range of requirements for cushioning torque-brake shock. In other words, this special mounting permits me to provide suitable constructions to take care of those requirements that are too severe for the limited area available with the standard mounting with its bolts in the plane of the inboard portion of the resilient material. Attention is again called to the fact, that with this mounting heat transfer from the brake shoe and brake lining to the driving member is restricted by the use of spaced mounting bosses and insulation between each boss and the driving member.

The axle, hub, hub flange, wheel mounting radius and bolts co-operating with said mounting, including their number and position circumferentially, brake drum and rim, shown in Figures 18 and 19 are reproduced from a 1938 Buick production layout and those shown in Figures 21 and 22 are from a Packard 120 layout, with each part and figure drawn to an approximate scale of ½ to 1.

Referring now to Figures 18 and 19, 105 is an outer abutment which with the inner abutment 106 contribute to form circumferentially spaced pockets, which act as the driving member. The annular bearing 108, which is assembled on the seat 134 of the spoke portion 110 of the driven member 107 and is rigidly supported by the annular flange 117 of the hub 111, is similar to the same part already described for Figures 1 and 10, and acts to maintain said driven member 107 concentric against axle load while permitting circumferential movement under torque-brake shock. The recesses 122 and 123 in the outer and inner abutments 105 and 106 are exactly the same as already shown and described for Figures 1 and 10. The rivets 119, which are located in the main recesses 121, permanently hold the outer and inner abutments 105 and 106 in assembly after the composite cushioning-bearing member 109, comprising the resilient member 132 and the bearing member 133 for maintaining the driven member 107 in axial alignment, have been positioned in relation to the spoke portion 110 of the driven member 107. These rivets 119 are relieved of excessive lateral stresses by the special nuts 136 seen in Figure 20, when the wheel is in service.

*Constant initial tension*

Attention is directed to the fact that I prefer to have the resilient member 132 under constant initial tension after assembly to insure a sensitive resilient action under torque-brake shock. The importance of this lies in the fact that proper cushioning of torque-brake shock requires that the resilient material becomes instantly active without any lag or build-up in order to take care of the more frequent small shocks and their cumulative destructive effect. There is also the problem of loss of resilience, commonly called permanent set, which is that part of the distortion which remains in rubber after the applied forces have been removed, that makes it advisable to assemble the rubber cushioning member in the pockets under proper pressure to compensate for future loss of its elastic effect. It has also been definitely proved that rubber under constant initial stress combats aging, especially when used under compression as I disclosed.

The circumferentially spaced extensions 118 of the outer abutment 105, hold the annular bearing 108 in its assembled position on the annular seat 117 of the hub 111. The clearance cut-outs 125, that permit the spoke portions 110 to move freely circumferentially on either side of the main recesses 121, are the same as already described for Figures 10 and 11. The interlocking means for converting torque-brake shock absorbing wheels into stiff wheels, and comprising the bolts 126, which are permanently attached to the ears 127 of the inner abutment 106, which move freely in the slots 128 in the driven member 107, is exactly the same as described for Figures 2 and 6. The rim 137 is permanently attached to the driven member 107 by any suitable means, such as for example the rivets shown in Figure 21. The brake drum 114 is permanently attached to the hub 111, by the bolts 124, which are located inside of the plane of the inner abutment 106 and out of the way of the operating assembly.

The circumferentially spaced pockets 130, in which are mounted the main wheel attaching bolts 113, are formed in the inner abutment 106, with their centers coinciding with the centers of the standard threaded holes in the hub flange 112 of the conventional hub 111. These pockets 130, as will be more clearly understood from Figures 19 and 20, are located in the inboard portion of the main recess 121, out of the plane of the inboard portion of the resilient member 132. By referring to Figure 20, it will be seen that the outer abutment 105 has the round opening 116 of larger diameter than the head of the bolt 113 and that the threaded head of said bolt extends beyond the opening 116 sufficiently to permit the special nut 136 to be attached to it to reinforce the assembly of the outer and inner abutments 105 and 106 against lateral stresses. The nut 136 and the head of the bolt 113 are round on the outside and are made with a recessed or inside hex of the same dimensions for tightening or loosening with the proper tool. These pockets 130, are so arranged in contact with the hub 111, that they act to reinforce the bolts 113 against shearing stresses. As will be noted from Figures

SEARC

1

19 and 20, the wheel mounting bolts 113 must necessarily have their heads in the plane of the inboard portion of the resilient material 132 and its adjuncts, when the desirable conventional wheel bolting means are used for obtaining interchangeability between the standard stiff wheels on the front or driven axle and torque-brake shock absorbing wheels on the rear or driving axle, notwithstanding the small bolting radius of said bolting means, which automatically reduces the available area for the operating assembly by at least 25%. The spoke portions 110 of the driven member 107 have the reinforcing flanges 131, which also act as a seat for the outer portion of the bearing members 133. The special flanged seats 135, which hold the inner portion of the bearing members 133 are preferably resistance welded to the spoke portions 110 and conform substantially to the radial contour of the spoke portions 110 as will be clearly understood from Figure 20.

In Figures 18, 19 and 20, the spoke portions 110 of the driven member 107 and their adjuncts, the resilient material 132, the bearing members 133 and the walls of the driving member that form the main recesses 121 are tapered radially towards the wheel center and along the same identical lines and form a common point at the wheel axis, to obtain the preferred form of uniform resilient action throughout the area of the resilient material, as already described. It will likewise be noted that the operating assembly, comprising said spoke portions 110 and their adjuncts, the resilient material 132, the bearing members 133 and the recesses and pockets formed in assembling the outer and inner abutments 105 and 106, have been moved towards the wheel center to an extent where the diameter of the annular bearing 108 closely approximates the diameter of the smallest section of the hub 111. In other words, the construction I disclose permits of the use of rubber under compression close enough to the wheel center to minimize the serious problem of centrifugal action, without adversely affecting the required resilient action and with ample provisions for taking care of radial load with concentric operation, and severe lateral stresses while maintaining the driven member perpendicular, or at right angles to the plane of the axis of rotation of the wheel.

Figures 21 and 22 are somewhat similar to Figures 18 and 19, the only differences being that the axle 138 is separate from the hub 139. The rim 171 has the quick detachable driving flange 150, and the spoke portions 145 of the driven member 142 do not have flanges but are reinforced by the inserts 167, as already described for Figures 1 and 2, and which are preferably welded to the spoke portions 145, but which may be dispensed with if desired. The rim rivets 165 are the same as in Figures 1 and 10.

In Figures 21 and 22, the axle 138 is keyed to the hub 139 and permanently held in position by the nut 152. The outer abutment 140 and the inner abutment 141 contribute to form the main recesses 156 which are a part of the circumferentially spaced pockets that act as the driving member and hold the resilient material 168, the bearing means 169, the insert 167 and the spoke portions 145 to which the bearing material 169 is firmly attached by vulcanization, if rubber is used. The hub flange 147 is the same as seen in Figure 1.

The extension 153 of the inner abutment 141 supports the annular bearing 143 which is mounted on the seat 170 of the driven member 142. The outboard rivets 154 and the inboard rivets 155, located in the main recesses 156, act to hold the outer and inner abutments 140 and 141 in permanent assembly. The circumferentially spaced pockets 146, in which are mounted the standard bolts 148, are exactly the same as described for Figures 18, 19 and 20. In Figures 21 and 22 I dispense with the special nut 136 shown in Figure 20, and the bolts 148 have hex heads that are recessed to permit tightening and loosening without requiring extra clearance at the opening 172 in the outer abutment 140. The small circumferentially spaced pockets 166, the inboard rivets 155 already mentioned, and the right angle ear 151 to hold the annular bearing 143 in assembled position, are clearly shown in Figures 21 and 22, as are the clearance cut-outs 160, of the driven member 142. The composite cushioning-bearing member 144, the recesses 157 in the outer abutment 140, and the recesses 158 in the inner abutment 141 are the same as similar parts shown and described for Figures 1, 10 and 18.

The quick detachable rim construction shown in Figures 21 and 22 has all the advantages described for similar constructions shown in Figures 7 and 8, plus the additional advantage of a substantial reduction in the diameter of the driven member 142, that simplifies handling, particularly if the bearing members 169 are made of rubber, as already described for Figures 1 and 2, and are vulcanized to the spoke portions 145. As will be noted, the annular flange 150 that drives the rim 171, has the circumferentially spaced pockets or recesses 163 that act as seats for the driven member 142, to resist shearing action. The number and size of these seats, as well as the bolts 161 and the nuts 162, will vary to comply with different requirements. The number and size of the vents 164 will also vary to suit different operating conditions.

Figure 24 is another embodiment of my invention wherein the hub 180 has a special seat 183, to receive and support the annular bearing 177, which is similar to the annular seat 117 of the hub 111, as seen in Figure 18. In this embodiment I also use the circumferentially spaced bosses 193, formed in the disc portion of the brake drum 182, as the wheel mounting to obtain a bolting circle of a large enough diameter to remove the bolts 113 and 148 and their adjuncts, seen in Figures 18, 19 and 22, from the plane of the inboard portion of the resilient material to provide unlimited uniform resilient action, without having to move the operating assembly outboard from its advantageous position towards the wheel center.

In Figures 24, 25 and 26, the hub 180 which has the flange 181, is mounted on and keyed to the axle 173 and held in position by the nut 210 and the washer 198. The seat 183 on the hub 180 receives the annular bearing 177, which is mounted on the annular extension 206 of the spoke portions 178 of the driven member 176. The outer abutment 174 has the circumferentially spaced extensions 211 which hold the annular bearing 177 in its assembled position, as shown in Figure 18. The outer abutment 174 and the inner abutment 175 are permanently held together by the inboard and outboard rivets 184 to form the circumferentially spaced pockets that hold the resilient members 203, the bearing members 202, the bearing seats 201, the compressed material 207 between the bearing and its seat, and the spoke portions 178 and their adjuncts of the driven member 176 adjacent to the bearing 202, as clearly shown in the enlarged Figure 26. The outer recess 187 in the other abutment 174 and a similar recess in the inner abutment 175, which cannot be seen, are exactly the same as already described for Figures 1, 10, 18, and 21, and perform the same functions of reinforcing the outer and inner abutment against distortion from lateral stresses and co-operating in maintaining the resilient material in its assembled position under torque-brake shock. The clearance cut-outs 188, in the driven member 176, are the same as described for Figures 18 and 21. The bearing seats 201, which are permanently attached to the spoke portions 178 by the rivets 200 or by any other suitable means, afford a commercially practical means to insure positive co-incidental movement, in either circumferential direction, of the bearing members 202 under torque-brake shock, while at the same time providing, in co-operation with the spoke portions 178, sufficient surface in contact with the resilient members 203 to obtain maximum efficiency in cushioning torque-brake shock. As will be noted from Figure 25, the radial contour of these seats is preferably substantially the same as the spoke portions 178. The recesses 186 in the outer abutment 174, are the same as shown and described for Figures 2, 11, 19 and 22.

The rim 204, has the annular driving flange 179 permanently attached to it by rivets or other suitable means, as already described for Figure 21. The flange 179 also has the circumferentially spaced pockets 191, that form seats for the driven member 176 to resist shearing stresses, the number and size of which will depend on the service contemplated. The bolts 189 which are permanently mounted on the driven member 176 and the nuts 190 are also the same as shown in Figure 21. The importance of a quick detachable rim construction in permitting the use of standard stiff wheels on the front or driven axle and torque-brake shock absorbing wheels on the rear or driving axle has already been referred to with Figures 7 and 8. In addition however to the principal advantage of dispensing with the need of carrying two kinds of spare wheels, which would be quite costly, and substituting one or more cheap interchangeable rim assemblies to fit both types of wheels to take care of tire collapse, etc., the quick detachable rim construction, shown in Figures 21 and 24, reduces the diameter of the driven member sufficiently to eliminate a serious production problem should the bearing members 202 be made of a rubber compound with bearing characteristics and vulcanization to the spoke portions 178 is economically desirable, as already referred to for Figure 21. It is easily understood that an integral driven member extending from the annular bearing 177 out to and including the rim 204 would prove more difficult and costly to handle in a vulcanization operation than the smaller driven member 176 alone would be. And even if the rim 204 is attached after vulcanization, which is undesirable in many respects, the problem would still be present, if the driven member was made in one piece.

The brake drum wheel mounting seen in Figures 24 and 25, comprising the circumferentially spaced bosses 193, and the bolts 194, which are permanently seated in said bosses, has the insulating members 199 that are firmly fitted on the bolts 194 to separate the circumferentially spaced pockets 196, of the inner abutment 175 which have the reinforcing fins 197, from the bosses 193 to reduce heat transfer to said inner abutment 175 from the periphery of the brake drum and the brake lining 208. The assembling nut 195 and the bolt 194 are relieved of shearing stresses by the fins 197, which are fitted to the outboard section of the boss 193, and the rigid assembly of the bearing 177 on the seat 183 of the hub 180 to resist pressures from radial load with substantially concentric operation of the wheel assembly. The circumferentially spaced openings 192 in the rim driving flange 179 afford easy access to the brake drum wheel mounting assembly as well as ventilation to dissipate excessive brake drum heat. The circumferentially spaced rivets 205 hold the brake drum in position on the hub.

The compressible material 207 between the bearing seats 201 and the bearing members 202 of Figure 26, offers a practical means for maintaining constant, uniform, high pre-determined pressures between the outer and inner abutments 174 and 175, and the spoke portions 178 of the driven member 176 to insure stable, long time, perpendicular operation of said driven member under certain severe services. This construction also has the advantage of providing a commercially practical mass production means of insuring constant uniform predetermined bearing pressures between the driving and driven members, within close limits, in the event of an occasional, not easily detected, minor irregularity in the contour of the outer or inner abutments or both, that might cause excessive friction and wear on certain limited areas of the bearing members 202, for maintaining the driven member 176 perpendicular, or at right angles to the plane of the axis of rotation of the wheel, against lateral stresses, which is the serious problem involved in the successful operation of a torque-brake shock absorbing wheel.

*Synthetic rubber*

It has heretofore been considered that synthetic rubber was too costly for use in a commercially practical, mass production torque-brake shock absorbing wheel, notwithstanding its several advantages over ordinary rubber. An examination, however, of the embodiments of my invention shown in Figures 18, 19, 21, 22, 24 and 25, will disclose a construction, in proximity to the wheel center, of such efficiency and balance for obtaining relatively uniform resilient action throughout the area of the resilient material, as will warrant the use of synthetic rubber because of the self evident reduction in the amount of rubber required for satisfactory operation, as already described. Aging is still a problem in the satisfactory use of ordinary rubber in spite of the remarkable results achieved with anti-oxidants. And since the predetermined characteristics of a torque-brake shock absorbing wheel should remain practically unchanged throughout the life of the device, and as synthetic rubber compounds are superior to similar ordinary rubber compounds in resisting heat, friction and aging, three serious problems to overcome in obtaining stable torque-brake shock absorbing wheel operation, it will be advantageous to use synthetic rubber, particularly for the resilient member, in many instances, in view of the availability of the suitable constructions herein disclosed.

In Figures 27 and 28, I show another embodiment of my invention, wherein the outer and inner bearing members 213 and 214, for maintaining the driven member 215 perpendicular, are located outboard of the outer and inner resilient members 216 and 217, in the pockets 218 and 219 formed in the peripheral portions of the outer and inner abutments 220 and 221. The object of this construction is to provide a more powerful cushioning effect for certain heavy duty jobs, without losing the advantages of having the operating assembly in proximity to the wheel center. As will be clearly understood from Figure 28 and the enlarged Figure 29, by mounting the bearing members 213 and 214 out of the plane of the resilient members 216 and 127 I am able to provide a substantially increased amount of resilient material which will afford greater cumulative resistance to torque-brake shock while permitting adequate circumferential movement, without enlarging the circumferentially disposed pockets that hold said resilient material. As the spoke portions 222, which may or may not have the rounded edges as shown, approach the adjacent walls of the main recesses 223 under torque-brake shock, the outer and inner resilient members 216 and 217 are gradually spread apart at the center of the pocket parallel with said spoke portions until circumferential movement stops. Attention is directed to the fact that as the inserts 224 move with the spoke portions 222 under shock, the cumulative resistance built up by the resilient members 216 and 217 automatically exerts high retarding pressures on the walls of the spoke portions 222. Since this construction is preferably for heavy duty service, although it will be satisfactory in any service, I show the inserts 224 welded to the spoke portions 222 throughout their length and said spoke portions 222 formed with the flanges 225 and 226 to provide tremendous reinforcement to said spoke portions 222 against axle load without having to resort to increased widths and thicknesses of metal that might otherwise be required for heavy duty services. It is to be understood, however, that when the construction shown in Figures 27, 28 and 29, is used on light weight vehicles such as pleasure automobiles, the flanges 225 and 226 on the spoke portions 222 as well as welding the inserts 224 to said spoke portions may be dispensed with and the resilient material on each side of the inserts 224 made in one piece instead of segments. It is also to be understood that said inserts 224 may be replaced with any other suitable reinforcing means such as, for example, flanged members similar to those shown in Figure 26, which are riveted to the spoke portions.

The outer and inner abutments 220 and 221 of Figures 27 and 28, and the outer and inner recesses 227 and 228 in said abutments as well as the main recesses 223, that are provided by assembling said abutments with the outboard and inboard rivets 303 and 302 and contribute to the formation of the circumferentially disposed pockets that hold the resilient members 216 and 217, are the same as already described for Figures 2, 11, 18 and 25. The wheel mounting means comprising the bolts 229, the insulating members 230, and the assembling nuts 231, and their adjuncts are the same as already shown in Figure 24. The circumferentially spaced pockets 232 in the disc portions of the brake drum 233, are a modification of the bosses 193 of Figure 24, and permit of a rigid commercially practical mounting at the outboard section of the main recesses 223 with its larger area which is automatically accomplished by tapering the spoke portions 222 and their adjuncts, the resilient members 216 and 217, and the circumferentially disposed radial walls of the main recesses 223, towards the wheel center along identical radial lines originating in a common point at the wheel axis, whereby the two circumferentially spaced radial walls of said main recesses 223 are further apart with each increase of their radius, which is the construction I prefer for securing substantially uniform resilient action, radially throughout the area of the resilient material, as already described. It will be noted that this space at the outboard section of the main recesses 223 for accommodating the wheel mounting assembly, is as wide as the space occupied by the inboard wheel mounting assembly shown in Figures 19 and 22 and would permit of the use of such a wheel mounting without imposing any limitations on the circumferential movement contemplated for the construction shown in Figures 27 and 28.

The circumferentially disposed pockets 234, formed in the inner abutment 221 are so arranged as to contact the annular seat 235 of the hub 236 to relieve the wheel mounting assembly, especially the bolts 229 and the nuts 231, of excessive shearing stresses since the extension 237 of the inner abutment 221 supports the annular bearing 238, against radial load. The separate annular bearing 238, which is seated on the extension 239 of the driven member 215 is similar to the same part described for Figures 1, 10, 18 and 24. The central portions 240 and 241 of the driven member 215 and the inner abutment 221, are in contact with the noise deadening material 242, which is preferably assembled under pressure to secure the best results in suppressing noise.

*Noise isolation and suppression*

A great deal of effort and tremendous sums of money are now being spent in trying to isolate and suppress the many noises that are constantly annoying automobile owners. Since road noises are among the more noticeable, because of the ease with which they reach the chassis and body, attention is directed to the fact that the herein disclosed torque-brake shock absorbing wheel provides suitable and practical means for not only isolating road noises but of suppressing those noises before they have become amplified, as in the case of all standard stiff steel wheels, notwithstanding the use of noise deadening materials that are sprayed on or otherwise applied to the disc portions, of such wheels. In all of the embodiments of my invention shown in Figures 1 to 26, I refer to the preferred use of noise deadening bearing means for maintaining the driven member substantially concentric against radial load and the preferred use of separate noise deadening bearing means for maintaining the driven member perpendicular against lateral stresses, in combination with noise deadening resilient material, to isolate and suppress noises originating in the rim and its adjuncts that are transferred to the peripheral portions of the driven member. In accomplishing this desirable result I not only rely on the substantial amount of noise deadening bearing and resilient means surrounding the spoke portions of the driven member but prefer to so arrange said driven member at its inboard end that the annular noise deadening bearing at that point also separates said driven member from the adjacent wheel members to permanently prevent any chance of metal to metal contact between the driven member and any other metal part of the operating assembly, inboard of the rim and its adjuncts. In Figures 27 and 28 I apply further means in combination with the above means, for suppressing the noises, already described, in the form of the noise deadening member 242 of Figures 27 and 28, already referred to, which is held under contact with and separates the extension 240 of the driven member 215 from the extension 241 of the inner abutment 221, at the wheel center, a construction that is based on the accepted fact that noise deadening materials mounted at separate points on the same member increase the effectiveness of noise control.

The cut-outs 243 in the inboard section of the spoke portions 222 of the driven member 215, which are necessary to permit free circumferential movement of the spoke portions 222 of the driven member 215, on either side of the circumferentially spaced main recesses 223, are the same as already described for Figures 10, 11, 18, 19, 21, 22 and 25. The compressible members 244 and 245, mounted between the outer and inner bearing members 213 and 214 and the walls of the adjacent pockets 218 and 219, that are formed in the outboard portions of the outer and inner abutments 220 and 221, perform the same function as already described for similar members shown in Figure 26. The recesses 246 and 247 in said outer and inner pockets 218 and 219 are to prevent said compressible material from shifting after assembly. It is to be understood that the use of these compressible members 244 and 245, is only contemplated in certain unanticipated emergencies, and will be dispensed with under most manufacturing and assembling conditions where reasonable accuracy will be the rule instead of the exception.

The rim 248, has the annular driving flange 249, rigidly attached to it by the rivets 250. In this driving flange 249 are the vent holes 251 and at its inboard portions are the circumferentially spaced mounting ears 252, which act as a seat to receive the peripheral portions 253 of the driven members 215. The bolts 254, are permanently attached to the mounting ears 252 of the rim driving flange 249 and with the nuts 256 act to maintain the driven member 215 in rigid assembly on the annular rim driving flange 249. In this construction I have all of the advantages described for similar quick detachable rim assemblies seen in Figures 21 and 24. To remove the rim 248 and its adjuncts merely requires that the nut 256 be taken off and the rim 248 with its annular driving flange 249 be pushed back towards the brake drum 233 to free the bolts 254 which will then permit the rim 248 and its adjuncts to be turned to the right or left until the ears 252 with the bolts 254 are in the open space 257 where the entire rim assembly is free to be pulled outward for replacement, etc. The same simple operation is reversed in remounting the rim assembly on to the driven member 215 at its periphery. It is of course to be understood that in many instances in practice this quick detachable rim construction will be dispensed with for an integral construction wherein the annular driving flange 249 becomes a part of the driven member 215. In the embodiments of my invention shown in Figures 27 and 28, it will be noticed that the driven member 215, comprises several circumferentially spaced outboard portions that are preferably joined together inboard to form an integral central portion of great strength and stability.

The axle 258, the hub 236, the hub flange 260, the key seat 261, the axle nut 262, the washer 263, and the rivets 264, that hold the brake drum 233 in assembly, are the same as already described for Figures 21 and 24. The cover 265, which is held in position on the rim driving flange 249 by the spaced spring supports 266 that are attached to the driven member 215 by the rivets 267, is preferably sprayed on its inner surface with a suitable noise deadening material. It will be noted that this assembly of rim, cover, driven member and their adjuncts, moves as a unit circumferentially.

The interlocking means seen in Figure 28, comprising the bolts 305, which are permanently mounted on the driven member 215, and the open ended slots 304 in the outer abutment or driving member 220, for converting torque-brake shock absorbing operation into stiff wheel operation by preventing circumferential movement between said driven and driving members, is similar to the same constructions seen in Figures 2 and 19.

The embodiment of my invention seen in Figure 30, is a modification of the embodiment seen in Figures 27 and 28. The difference in construction is the use of outer and inner annular bearings for maintaining the driven member perpendicular, to replace the disconnected bearings seen in Figure 27. The outer annular bearing 268, replaces the separate outer bearings 213 of Figure 28, and a similar inner annular bearing, which is not seen, replaces the separate inner bearings 214, seen in Figure 27. To accommodate these annular bearings, the bearing seats 269, at the periphery of the outer abutment 270 and similarly arranged seats in the inner abutment, are open at each side adjacent to the main recesses 271. The main mounting bolts 272 and nuts 273, are preferably moved inboard to clear this annular bearing 268 and the single assembly rivets 274, replace the double rivets 302 and 303 seen in Figures 27 and 28. To properly support the annular bearing 268 against lateral stresses, the peripheral bearing seats 269, in the outer abutment 270, and similarly in the inner abutment, are reinforced radially by the protuberances 275. The reinforcing recesses 276, the driven member 277, the open spaces 278 adjacent to the rim driving flange and all other parts not shown or mentioned are the same as seen in Figures 27 and 28.

The embodiment of my invention seen in Figure 31 is another modification of the embodiment seen in Figures 27 and 28. In this modification the outer abutment 279 and the inner abtument 280, are formed with the same depth laterally and are joined together at the center of the main recesses they form by the rivets 281. The object of this construction is to reduce taper or draft in the outer and inner abutments 279 and 280, in the event it is desired to materially increase the lateral depth of the pockets that are formed by joining the outer and inner abutments 279 and 280 to accommodate more resilient and bearing material, with or without increasing their length radially, or in event the outer and inner abutments 279 and 280 have to be made of heavy gauge metals and deep drawing with a minimum of draft, as is advisable, is a problem and dividing the lateral depth of the circumferentially spaced pockets equally between said outer and inner abutments removes the problem.

The hub 282, of Figure 31, has the annular bearing seat 283, which is similar to the seat 183 of Figure 24, and which with the annular bearing support 284 at the inboard section 285 of the driven member 286 rigidly holds the separate annular bearing 287 against radial load. The axle nut 288 and washer 289, the central portion 290 of the driven member 286, and the noise deadening material 291, as well as the center section 306 and the circumferentially spaced extensions 292 of the outer abutment 279, which replace the center section 241 and the annular extension 237 of the inner abutment 221 of Figure 27, perform the same functions already described for similar parts of Figures 27 and 28. The annular inboard section 285 of the driven member 286 is welded to the spoke portions 294 of the driven member as already described for a similar welded spoke and bearing support construction seen in Figures 1 and 2.

The wheel mounting means of Figure 31, comprising the mounting bolts 295, which are permanently held in position on the hub flange 299, the insulating nuts 296, the attaching nuts 297 and the circumferentially spaced pockets 298 formed in the inner abutment 280, and their adjuncts, provide a rigid, practical, wheel mounting. The brake drum 300, and the brake drum rivets 301, and all other parts not shown or mentioned are the same as described for Figures 27 and 28. As will be noted, the circumferentially spaced pockets 298, are similar to the wheel mounting pockets 130 of Figure 18 and 146 of Figure 21, the only difference being that the pockets 298 have been placed outboard away from the plane of the inboard section of the resilient material in order to obtain the same exact resilient action or circumferential movement between the driving and driven members under torque-brake shock as is contemplated in Figures 27 and 28. It has already been explained for Figures 27 and 28, that the preferred construction for obtaining substantially uniform resilient action, without losing the advantages of having the operating assembly in proximity to the wheel center, by tapering the spoke portions and their adjuncts, the resilient material, and the circumferentially disposed radial walls of the main recesses and pockets towards the wheel center along identical radial lines originating in a common point at the wheel axis, automatically provides ample mounting space at the point where the pockets 298 are located without interfering with circumferential movement between the driving and driven members under shock. The use of this type of wheel mounting and attaching means whereby there is only a line contact between the pockets 298 and the insulating nut 296 or its equivalent, materially reduces heat transmission and absorption from the brake drum 300 to the inner abutment 280. The half round cut out 293, in the outer abutment 279, to provide proper clearance for the wheel attaching nut 297, is similar to the round opening 172 in the outer abutment 140 of Figure 22.

*Lateral stability*

Unlike flexible couplings or even flexible hubs, where lateral stresses do not present a serious problem, a torque-brake shock absorbing wheel for automotive service does present such a problem in its worst form because of road conditions, radial load, and more particularly rounding curves at high or low speeds, and sudden swerving in and out of traffic, which are only a few of the severe operating conditions imposed on a torque-brake shock absorbing wheel with normal driving. Therefore, in all of the embodiments of my invention herein disclosed, independent, adequate, and stable bearing means to maintain the driven member perpendicular or at right angles to the plane of the axis of rotation of the wheel, have been provided because of the vital importance of the problems involved, which heretofore have usually been approached with compromise solutions, wherein the resilient material for cushioning shock by compression has been required to perform a double duty and take care of lateral stresses as well by being assembled under such high pressures as to generally result in a substantial loss of necessary resiliency and little or no gain, from a commercially practical standpoint, in bearing efficiency, except for very lightweight vehicles. In other words a feature of prime importance is sacrificed to obtain a questionable solution to another feature of equal importance, which requires specially designed materials having definite bearing characteristics as opposed to resiliency. If the same kind of materials but of different characteristics are used for the bearing and resilient members in certain services, such as for example on lightweight vehicles in which lateral stresses are not very high, special means should be provided nevertheless to assemble each member under different pressures, as is practical with the constructions herein disclosed for fixedly mounting the bearing members on either the driven member or driving member. In all of the embodiments of my invention, I prefer to provide ample and distinctive bearing means to maintain the driven member perpendicular, and ample and distinctive resilient means to cushion torque-brake shock, even if and when both such means are assembled in a common pocket, and even if they are joined together, which may be desirable when rubber, although of different compounds and characteristics, is the material used in the production of the resilient and bearing members, as already described.

The radial lines A—A′ of Figure 2, B—B′ of Figure 11, C—C′ of Figure 19, and D—D′ of Figure 28, indicate approximately the maximum range of resilient action or circumferential movement between the driving and driven members under torque-brake shock. The distance from the wheel axis to the arrows on the movement lines is the same for each figure.

Having thus described my invention what I claim as new and desire to secure by Letters Patent, is:

1. In a torque-brake shock absorbing wheel, an inner and an outer abutment contributing to form circumferentially spaced pockets which act as the driving member, compressible, synthetic rubber in said pockets having a greater range of uniform resilient action at its outer peripheral portion than at its inner peripheral portion under torque-brake shock, a driven member having spoke portions extending into said pockets which are acted on by said synthetic rubber to cushion and limit circumferential movement between said driven member and said pockets, and two separate bearing members, one of which maintains said driven member substantially concentric against radial load, and the other of which maintains said driven member in a plane perpendicular to the axis of rotation against lateral thrust.

2. In a torque-brake shock absorbing wheel, an inner and an outer abutment contributing to form circumferentially spaced pockets which act as the driving member, compressible, resilient material in said pockets having a greater range of uniform resilient action at its outer peripheral portion than at its inner peripheral portion under torque-brake shock, a driven member having spoke portions extending into said pockets which are acted on by said resilient material to cushion and limit circumferential movement between said driven member and said pockets, said driven member having a rim connected to it, and two separate bearing members, one of which maintains said driven member substantially concentric against radial load, a ndthe other of which maintains said driven member in a plane perpendicular to the axis of rotation against lateral thrust, a brake drum having mounting means, said driving member having attaching means co-operating with said mounting means to provide immediate assembly and demounting of the driving and driven members and their adjuncts as a unit, with the centers of said attaching means being located in proximity to the outer periphery of the resilient material to permit greater resilient action.

3. In a torque-brake shock absorbing wheel, an inner and an outer abutment contributing to form circumferentially spaced pockets which act as the driving member, compressible, resilient material in said pockets having a greater range of uniform resilient action at its outer peripheral portion than at its inner peripheral portion under torque-brake shock, a driven member having spoke portions extending into said pockets which are acted on by said resilient material to cushion and limit circumferential movement between said driven member and said pockets, said driven member having a rim connected to it, and two separate bearing members, one of which maintains said driven member substantially concentric against radial load, and the other of which maintains said driven member in a plane perpendicular to the axis of rotation against lateral thrust, which said bearing member employed to resist lateral thrust fixedly mounted on said driven member to provide positive co-incidental circumferential movement of said bearing member with said driven member, and a compressible member between said driven member and said bearing member to provide substantially uniform bearing pressures between the driving and driven members and to keep said pressures within predetermined limits.

4. In a torque-brake shock absorbing wheel, an inner and an outer abutment contributing to form circumferentially spaced pockets which act as the driving member, compressible, resilient material in said pockets having a greater range of uniform resilient action at its outer peripheral portion than at its inner peripheral portion under torque-brake shock, a driven member having spoke portions extending into said pockets which are acted on by said resilient material to cushion and limit circumferential movement between said driven member and said pockets, said driven member having a rim connected to it, and two separate bearing members, one of which maintains said driven member substantially concentric against radial load, and the other of which maintains said driven member in a plane perpendicular to the axis of rotation against lateral thrust, and a hub having a seat to receive said bearing member to maintain said driven member concentric.

5. In a torque-brake shock absorbing wheel, an inner and an outer abutment contributing to form circumferentially spaced pockets which act as the driving member, compressible, resilient material in said pockets having a greater range of uniform resilient action at its outer peripheral portion than at its inner peripheral portion under torque-brake shock, a driven member having spoke portions extending into said pockets which are acted on by said resilient material to cushion and limit circumferential movement between said driven member and said pockets, said driven member having a rim connected to it, and two separate bearing members, one of which maintains said driven member substantially concentric against radial load, and the other of which maintains said driven member in a plane perpendicular to the axis of rotation against lateral thrust, the location of said pockets, spoke portions, resilient material, and their adjuncts being in proximity to the wheel center to minimise centrifugal action and heat absorption, with said bearing member employed to resist lateral thrust fixedly mounted on said driven member to provide positive co-incidental circumferential movement of said bearing member with said driven member, a hub and brake drum assembled as a unit, mounting means on said hub-brake drum assembly co-operating with attaching means on said driving member to provide immediate attachment and demounting of the driving and driven members and their adjuncts as a unit, with the centers of said attaching means being located in proximity to the outer periphery of the resilient material to permit greater resilient action.

6. In a torque-brake shock absorbing wheel, an inner and an outer abutment contributing to form circumferentially spaced pockets which act as the driving member, compressible, resilient material in said pockets having a greater range of uniform resilient action at its outer peripheral portion than at its inner peripheral portion under torque-brake shock, a driven member having spoke portions extending into said pockets which are acted on by said resilient material to cushion and limit circumferential movement between said driven member and said pockets, said driven member having a rim connected to it, and two separate bearing members, one of which maintains said driven member substantially concentric against radial load, and the other of which maintains said driven member in a plane perpendicular to the axis of rotation against lateral thrust, the location of said pockets, spoke portions, resilient material and their adjuncts being in proximity to the wheel center to minimize centrifugal action and heat absorption, a hub and brake drum assembled as a unit, mounting means on said hub-brake drum assembly co-operating with attaching means on said driving member to provide immediate attachment and demounting of the driving and driven members and their adjuncts as a unit, with the centers of said attaching means being located in proximity to the outer periphery of the resilient material to permit greater resilient action, said rim having a driving portion, said driving portion and said driven member having means to provide immediate assembly and demounting of said rim and its adjuncts to or from said driven member.

7. In a torque-brake shock absorbing wheel, an inner and an outer abutment contributing to form circumferentially spaced pockets which act as the driving member, compressible, resilient material in said pockets having a greater range of uniform resilient action at its outer peripheral portion than at its inner peripheral portion under torque-brake shock, a driven member having spoke portions extending into said pockets which are acted on by said resilient material to cushion and limit circumferential movement between said driven member and said pockets, said driven member having a rim connected to it, and two separate bearing members, one of which maintains said driven member substantially concentric against radial load, and the other of which maintains said driven member in a plane perpendicular to the axis of rotation against lateral thrust, with said bearing member employed to resist lateral thrust fixedly mounted on said driven member to provide positive co-incidental circumferential movement of said bearing member with said driven member, said rim having a driving portion, said driving portion and said driven member having means to provide immediate assembly and demounting of said rim and its adjuncts to or from said driven member.

8. In a torque-brake shock absorbing wheel, an inner and an outer abutment contributing to form circumferentially spaced pockets which act as the driving member, compressible, resilient material in said pockets having a greater range of uniform resilient action at its outer peripheral portion than at its inner peripheral portion under torque-brake shock, a driven member having spoke portions extending into said pockets, which are acted on by said resilient material to cushion and limit circumferential movement between said driven member and said pockets, said driven member having a rim connected to it, and two separate bearing members, one of which maintains said driven member substantially concentric against radial load, and the other of which maintains said driven member in a plane perpendicular to the axis of rotation against lateral thrust, said resilient material being assembled in said pockets under a predetermined pressure to provide a sensitive resilient action by maintaining said resilient material under constant initial stress.

9. In a torque-brake shock absorbing wheel, an inner and an outer abutment contributing to form circumferentially spaced pockets which act as the driving member, compressible, noise deadening, resilient material in said pockets having a greater range of uniform resilient action at its outer peripheral portion than at its inner peripheral portion under torque-brake shock, a driven member having spoke portions extending into said pockets which are acted on by said noise deadening resilient material to cushion and limit circumferential movement between said driven member and said pockets, said driven member having a rim connected to it, and two separate bearing members, one of which maintains said driven member substantially concentric against radial load, and the other of which maintains said driven member in a plane perpendicular to the axis of rotation against lateral thrust, said bearing members permanently separating said driven member from the rest of the wheel and being made of noise deadening materials, the space between said driving and driven members at the wheel center having noise deadening material in it in contact with said driving and driven members, and which in combination with said noise deadening, resilient materal and bearing members substantially isolates and suppresses road noises originating in the driven member and its adjuncts.

10. In a torque-brake shock absorbing wheel, an inner and an outer abutment contributing to form circumferentially spaced pockets which act as the driving member, compressible, resilient material in said pockets having a greater range of uniform resilient action at its outer peripheral portion than at its inner peripheral portion under torque-brake shock, a driven member having spoke portions extending into said pockets which are acted on by said resilient material to cushion and limit circumferential movement between said driven member and said pockets, said driven member having a rim connected to it, and two separate bearing members, one of which maintains said driven member substantially concentric against radial load, and the other of which maintains said driven member in a plane perpendicular to the axis of rotation against lateral thrust, said driving member, and a compressible member between said driving member and said bearing member to provide substantially uniform bearing pressures between said driving and driven members and to keep said pressures within predetermined limits.

11. In a torque-brake shock absorbing wheel, an inner and an outer abutment contributing to form circumferentially spaced pockets which act as the driving member, compressible, resilient material in said pockets having a greater range of uniform resilient action at its outer peripheral portion than at its inner peripheral portion under torque-brake shock, a driven member having spoke portions extending into said pockets which are acted on by said resilient material to cushion and limit circumferential movement between said driven member and said pockets, said driven member having a rim connected to it, and two separate bearing members, one of which maintains said driven member substantially concentric against radial load, and the other of which maintains said driven member in a plane perpendicular to the axis of rotation against lateral thrust, the location of said pockets, spoke portions, resilient material, and their adjuncts being in proximity to the wheel center to minimize centrifugal action and heat absorption, with said bearing member employed to resist lateral thrust fixedly mounted on said driving member to provide positive co-incidental circumferential movement of said bearing member with said driving member, a hub and brake drum assembled as a unit, mounting means on said hub-brake drum assembly co-operating with attaching means on said driving member to provide immediate attachment and demounting of the driving and driven members and their adjuncts as a unit, with the centers of said attaching means being located in proximity to the outer periphery of the resilient material to permit greater resilient action.

12. In a torque-brake shock absorbing wheel, an inner and an outer abutment contributing to form circumferentially spaced pockets which act as the driving member, compressible, resilient material in said pockets having a greater range of uniform resilient action at its outer peripheral portion than at its inner peripheral portion under torque-brake shock, a driven member having spoke portions extending into said pockets which are acted on by said resilient material to cushion and limit circumferential movement between said driven member and said pockets, said driven member having a rim connected to it, and two separate bearing members, one of which maintains said driven member substantially concentric against radial load, and the other of which maintains said driven member in a plane perpendicular to the axis of rotation against lateral thrust, the location of said pockets, spoke portions, resilient material, and their adjuncts being in proximity to the wheel center, with said bearing member employed to resist lateral thrust fixedly mounted on said driving member to provide positive co-incidental circumferential movement of said bearing member with said driving member, said rim having a driving portion, said driving portion and said driven member having means to provide immediate assembly and demounting of said rim and its adjuncts to or from said driven member.

13. In a torque-brake shock absorbing wheel, an inner and an outer abutment contributing to form circumferentially spaced pockets which act as the driving member, compressible, noise deadening, resilient material in said pockets having a greater range of uniform resilient action at its outer peripheral portion than at its inner peripheral portion under torque-brake shock, a driven member having spoke portions extending into said pockets which are acted on by said noise deadening resilient material to cushion and limit circumferential movement between said driven member and said pockets, said driven member having a rim connected to it, and two separate bearing members, one of which maintains said driven member substantially concentric against radial load, and the other of which maintains said driven member in a plane perpendicular to the axis of rotation against lateral thrust, said bearing members permanently separating said driven member from the rest of the wheel and being made of noise deadening materials, the space between said driving and driven members at the wheel center having noise deadening material in it to contact with said driving and driven members, and which in combination with said noise deadening, resilient material and bearing members substantially isolates and suppresses road noises originating in the driven member and its adjuncts, with said bearing member employed to resist lateral thrust fixedly mounted on said driving member to provide positive co-incidental circumferential movement of said bearing member with said driving member.

14. In a torque-brake shock-absorbing wheel, an inner and an outer abutment contributing to form circumferentially spaced pockets which act as the driving member, compressible, resilient material in said pockets, a driven member having spoke portions extending into said pockets which are acted on by said resilient material to cushion and limit circumferential movement between said driven member and said pockets, with said pockets, resilient material and spoke portions co-operating in a radial direction to provide uniform resilient action through the area of said resilient material by substantially equalizing the ratio of compression stress to compression strain under torque-brake shock, and two separate bearing members, one of which maintains said driven member substantially concentric against radial load, and the other of which maintains said driven member in a plane perpendicular to the axis of rotation against lateral thrust and permanently supports said driven member in spaced relation with said abutments.

15. In a torque-brake shock absorbing wheel, an inner and an outer abutment contributing to form circumferentially spaced pockets which act as the driving member, compressible, resilient material in said pockets having a greater range of uniform resilient action at its outer peripheral portion than at its inner peripheral portion, a driven member having spoke portions extending into said pockets which are acted on by said resilient material to cushion and limit circumferential movement between said driven member and said pockets, said driven member having a rim connected to it, and two separate bearing members, one of which maintains said driven member substantially concentric against radial load, and the other of which maintains said driven member in a plane perpendicular to the axis of rotation against lateral thrust, with said resilient material fixedly mounted on said spoke portions to provide positive co-incidental circumferential action between said resilient material and said spoke portions under torque-brake shock.

16. In a torque-brake shock absorbing wheel, an inner and an outer abutment contributing to form circumferentially spaced pockets which act as the driving member, compressible, resilient material in said pockets having a greater range of uniform resilient action at its outer peripheral portion than at its inner peripheral portion, a driven member having spoke portions extending into said pockets which are acted on by said resilient material to cushion and limit circumferential movement between said driven member and said pockets, said driven member having a rim connected to it, and two separate bearing members, one of which maintains said driven member substantially concentric against radial load, and the other of which maintains said driven member in a plane perpendicular to the axis of rotation against lateral thrust, with said resilient material fixedly mounted on said pockets to provide positive co-incidental circumferential action between said resilient material and said pockets under torque-brake shock.

17. In a torque-brake shock absorbing wheel, an inner and an outer abutment contributing to form circumferentially spaced pockets which act as the driving member, compressible, resilient material in said pockets, a driven member having spoke portions extending into said pockets which are acted on by said resilient material to cushion and limit circumferential movement between said driven member and said pockets, and two separate members, one of which maintains said driven member substantially concentric against radial load, and the other of which maintains said driven member in a plane perpendicular to the axis of rotation against lateral thrust and permanently supports said driven member in spaced relation with said abutments.

18. A shock absorbing device, comprising two concentrically mounted relatively rotatable members, yielding means to cushion and limit relative rotation of said members under torsional shock, and bearings separate and distinct from said rotatable members and disposed laterally between said members and serving only to maintain said rotatable members in fixed, laterally spaced relationship against lateral thrust.

19. A shock absorbing device, comprising two concentrically mounted relatively rotatable members, yielding means to cushion and limit relative rotation of said members under torsional shock, and bearings separate and distinct from said rotatable members and disposed radially and laterally between said members, one of said bearings serving only to maintain said members in substantially fixed, raidally spaced relationship against radial thrust and the other of said bearings being located outboard radially of said first bearing and serving only to maintain said rotatable members in fixed, laterally spaced relationship against lateral thrust.

20. A shock absorbing device, comprising two

AND WATERS

SEARCH concentrically mounted relatively rotatable members, yielding means to cushion and limit relative rotation of said members under torsional shock, and bearings separate and distinct from said rotatable members and disposed radially and laterally between said members, one of said bearings serving only to maintain said members in substantially fixed, radially spaced relationship against radial thrust and the other of said bearings being fixedly mounted on one of said rotatable members and serving only to maintain said members in fixed, laterally spaced relationship against lateral thrust.

21. A shock absorbing device, comprising two concentrically mounted relatively rotatable members, yielding means to cushion and limit relative rotation of said members under torsional shock, and bearings separate and distinct from said rotatable members and disposed radially and laterally between said members, one of said bearings serving only to maintain said members in substantially fixed, radially spaced relationship against radial thrust and the other of said bearings being located outboard radially of the outer periphery of the yielding means and serving only to maintain said rotatable members in fixed, laterally spaced relationship against lateral thrust.

22. A shock absorbing device, comprising two concentrically mounted relatively rotatable members, one of which is provided with circumferentially spaced pockets, and the other of which extends into said pockets, yielding means in said pockets and interposed between said members to cushion and limit relative rotation of said members under torsional shock, and bearings separate and distinct from said rotatable members and disposed radially and laterally between said members, one of said bearings serving only to maintain said members in substantially fixed, radially spaced relationship against radial thrust and the other of said bearings serving only to maintain said rotatable members in fixed, laterally spaced relationship against lateral thrust.

23. In a torque-brake shock absorbing wheel, an inner and an outer abutment contributing to form circumferentially spaced pockets which act as the driving member, compressible, resilient material in said pockets having a greater range of uniform resilient action at its outer peripheral portion than at its inner peripheral portion under torque-brake shock, a driven member having spoke portions extending into said pockets which are acted on by said resilient material to cushion and limit circumferential movement between said driven member and said pockets, said driven member having a rim connected to it, and bearings separate and distinct from said driving and driven members and disposed radially and laterally between said members, one of said bearings serving only to maintain said members in substantially fixed, radially spaced relationship against radial thrust and the other of said bearings serving only to maintain said driving and driven members in fixed, laterally spaced relationship against lateral thrust.

24. In a torque-brake shock absorbing wheel, an inner and an outer abutment contributing to form circumferentially spaced pockets which act as the driving member, compressible, resilient material in said pockets having a greater range of uniform resilient action at its outer peripheral portion than at its inner peripheral portion under torque-brake shock, a driven member having spoke portions extending into said pockets which are acted on by said resilient material to cushion and limit circumferential movement between said driven member and said pockets, and bearings separate and distinct from said driving and driven members and disposed radially and laterally between said members, one of said bearings serving only to maintain said members in substantially fixed, radially spaced relationship against radial thrust and the other of said bearings serving only to maintain said driving and driven members in fixed, laterally spaced relationship against lateral thrust, with said bearings employed to resist lateral thrust fixedly mounted on said driven member to provide positive co-incidental circumferential movement of said bearings with said driven member.

25. In a torque-brake shock absorbing wheel, an inner and an outer abutment contributing to form circumferentially spaced pockets which act as the driving member, compressible, resilient material in said pockets having a greater range of uniform resilient action at its outer peripheral portion than at its inner peripheral portion under torque-brake shock, a driven member having spoke portions extending into said pockets which are acted on by said resilient material to cushion and limit circumferential movement between said driven member and said pockets, said driven member having a rim connected to it, and bearings separate and distinct from said driving and driven members and disposed radially and laterally between said members, one of said bearings serving only to maintain said members in substantially fixed, radially spaced relationship against radial thrust and the other of said bearings serving only to maintain said driving and driven members in fixed, laterally spaced relationship against lateral thrust, said rim having a driving portion, said driving portion and said driven member having means to provide immediate assembly and demounting of said rim and its adjuncts to or from said driven member.

26. In a torque-break shock absorbing wheel, an inner and an outer abutment contributing to form circumferentially spaced pockets which act as the driving member, compressible, resilient material in said pockets having a greater range of uniform resilient action at its outer peripheral portion than at its inner peripheral portion under torque-brake shock, a driven member having spoke portions extending into said pockets which are acted on by said resilient material to cushion and limit circumferential movement between said driven member and said pockets, and bearings separate and distinct from said driving and driven members and disposed radially and laterally between said members, one of said bearings serving only to maintain said members in substantially fixed, radially spaced relationship against radial thrust and the other of said bearings serving only to maintain said driving and driven members in fixed, laterally spaced relationship against lateral thrust, said driving member and said driven member having interlocking means to temporarily prevent circumferential movement between them under torque-brake shock.

27. In a torque-brake shock absorbing wheel, an inner and an outer abutment contributing to form circumferentially spaced pockets which act as the driving member, compressible, resilient material in said pockets having a greater range of uniform resilient action at its outer peripheral portion than at its inner peripheral portion under torque-brake shock, a driven member having spoke portions extending into said pockets which are acted on by said resilient material to cushion and limit circumferential movement between said driven member and said pockets, and bearings separate and distinct from said driving and driven members and disposed radially and laterally between said members, one of said bearings serving only to maintain said members in substantially fixed, radially spaced relationship against radial thrust and the other of said bearings serving only to maintain said driving and driven members in fixed, laterally spaced relationship against lateral thrust, the walls of said pockets having circumferentially disposed reinforcing means to resist distortion from lateral stresses and to co-operate in maintaining said resilient material in its assembled state.

28. In a torque-brake shock absorbing wheel, an inner and an outer abutment contributing to form circumferentially spaced pockets which act as the driving member, compressible, noise deadening, resilient material in said pockets having a greater range of uniform resilient action at its outer peripheral portion than at its inner peripheral portion under torque-brake shock, a driven member having spoke portions extending into said pockets which are acted on by said noise deadening resilient material to cushion and limit circumferential movement between said driven member and said pockets, and bearings separate and distinct from said driving and driven members and disposed radially and laterally between said members, one of said bearings serving only to maintain said members in substantially fixed, radially spaced relationship against radial thrust and the other of said bearings serving only to maintain said driving and driven members in fixed, laterally spaced relationship against lateral thrust, said bearings being made of noise deadening materials, and which in combination with said noise deadening resilient material, substantially isolates and suppresses road noises originating in the driven member and its adjuncts.

29. In a torque-brake shock absorbing wheel, an inner and an outer abutment contributing to form circumferentially spaced pockets which act as the driving member, compressible, resilient material in said pockets having a greater range of uniform resilient action at its outer peripheral portion than at its inner peripheral portion under torque-brake shock, a driven member having spoke portions extending into said pockets which are acted on by said resilient material to cushion and limit circumferential movement between said driven member and said pockets, and bearings separate and distinct from said driving and driven members and disposed radially and laterally between said members, one of said bearings serving only to maintain said members in substantially fixed, radially spaced relationship against radial thrust and the other of said bearings serving only to maintain said driving and driven members in fixed, laterally spaced relationship against lateral thrust, with said bearings employed to resist lateral thrust fixedly mounted on said driving member to provide positive co-incidental circumferential movement of said bearings with said driving member.

30. In a torque-brake shock absorbing wheel, an inner and an outer abutment contributing to form circumferentially spaced pockets which act as the driving member, compressible, resilient material in said pockets, a driven member having spoke portions extending into said pockets which are acted on by said resilient material to cushion and limit circumferential movement between said driven member and said pockets, said pockets, resilient material and spoke portions being wedge shaped in a radial direction and co-operating to provide uniform resilent action throughout the area of said resilient material by substantially equalizing the ratio of compression stress to compression strain under torque-brake shock, and bearings separate and distinct from said driving and driven members and disposed radially and laterally between said members, one of said bearings serving only to maintain said members in substantially fixed, radially spaced relationship against radial thrust and the other of said bearings serving only to maintain said driving and driven members in fixed, laterally spaced relationship against lateral thrust.

31. In a torque-brake shock absorbing wheel, an inner and an outer abutment contributing to form circumferentially spaced pockets which act as the driving member, compressible, resilient material in said pockets having a greater range of uniform resilient action at its outer peripheral portion than at its inner peripheral portion, a driven member having spoke portions extending into said pockets which are acted on by said resilient material to cushion and limit circumferential movement between said driven member and said pockets, and bearings separate and distinct from said driving and driven members and disposed radially and laterally between said members, one of said bearings serving only to maintain said members in substantially fixed, radially spaced relationship against radial thrust and the other of said bearings serving only to maintain said driving and driven members in fixed, laterally spaced relationship against lateral thrust, with said spoke portions having radially disposed reinforcing means forming seats for said resilient material and co-operating to provide a positive co-incidental circumferential action between said resilient material and said spoke portions under torque-brake shock.

WILLIAM A. BROWN.